United States Patent
Matsui et al.

(10) Patent No.: US 7,542,745 B2
(45) Date of Patent: Jun. 2, 2009

(54) WIRELESS DEVICE AND WIRELESS CHANNEL MEASUREMENT CONTROLLER

(75) Inventors: Takayuki Matsui, Osaka (JP); Taro Mikami, Osaka (JP); Tadao Inoue, Hyogo (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 11/302,324

(22) Filed: Dec. 14, 2005

(65) Prior Publication Data

US 2006/0135191 A1    Jun. 22, 2006

(30) Foreign Application Priority Data

Dec. 17, 2004  (JP)  ............................. 2004-365829
Nov. 8, 2005   (JP)  ............................. 2005-324074

(51) Int. Cl.
    H04B 1/40    (2006.01)
(52) U.S. Cl. .................................. 455/161.1; 455/161.3
(58) Field of Classification Search ................ 455/434, 455/450, 455, 464, 451, 452.1, 509, 516, 455/154.1, 158.1, 166.1, 166.2, 179.1
    See application file for complete search history.

(56) References Cited

U.S. PATENT DOCUMENTS

| 6,636,738 | B1 * | 10/2003 | Hayashi ....................... 455/450 |
| 2002/0060995 | A1 | 5/2002 | Cervello et al. |
| 2005/0013275 | A1 * | 1/2005 | Black et al. .................. 370/329 |

* cited by examiner

*Primary Examiner*—Tu X Nguyen
(74) *Attorney, Agent, or Firm*—McDermott Will & Emery LLP

(57) ABSTRACT

In measurement of wireless channels in an IEEE 802.11 wireless local area network (WLAN), in the case of multi-channel measurement as in North America in which eight wireless channels Ch1 through Ch8 are available, channel measurement according to a predetermined algorithm is made in which odd-numbered channels Ch1, Ch3, Ch5 and Ch7 are first measured, and if radio interference occurs in channel Ch5, channels Ch4 and Ch6 adjacent to channel Ch5 are measured. This shortens the measurement time that conventionally corresponds to measurement of the eight channels to the time of six channels, i.e., the sum of the measurement time for the odd-numbered channels and that for the channels adjacent to the interference-occurring channel.

19 Claims, 15 Drawing Sheets

10 BSS AREA
A
WIRELESS DEVICE

WIRELESS DEVICE AND WIRELESS CHANNEL MEASUREMENT CONTROLLER

CROSS-REFERENCE TO RELATED APPLICATIONS

This application claims priority under 35 U.S.C. §119(a) on Patent Application No. 2004-365829 filed in Japan on Dec. 17, 2004 and Patent Application No. 2005-324074 filed in Japan on Nov. 8, 2005, the entire contents of which are hereby incorporated by reference.

BACKGROUND OF THE INVENTION

The present invention relates to a wireless device and a wireless channel measurement controller, and more particularly to a technology related to a channel selection method for wireless channel measurement in the IEEE 802.11 wireless local area network (WLAN).

A wireless local area network (WLAN) is basically composed of a base station (access point; AP) and called stations (stations; STAs) (both the base station and the stations are also called wireless terminals). The stations and the access point that are within the same radio coverage are known as a basic service set (BSS). When such BSSs are located close to each other and operate at the same channel, which are referred to as overlapping BSSs, it is difficult to support required quality-of-service due to possible contentions between the overlapping BSSs. To avoid such problems, if channel interference occurs persistently in one or more stations and/or the access point in a particular BSS, the access point dynamically selects a new wireless link to maintain the operation of the BSS.

To dynamically select a channel for communication between a plurality of stations and the access point located within the coverage of a BSS, among available wireless channels, the access point first determines whether or not the channel being used in the current communication by a plurality of wireless terminals is an appropriate channel, that is, whether or not selection of a new channel better in communication state is needed, and then requests a subset of stations to make a channel signal quality measure. To achieve this process, a set of channels available to the stations is determined. Using the determined set of available channels, detected are whether or not a signal of a channel identical to one included in the set of available channels has been received from an adjacent BSS, and whether or not there is radio interference from an adjacent BSS in any of the set of available channels. The stations measure the communication states of these available channels, and report the packet error rate (PER) and the received signal strength indication (RSSI) of all the channels measured by the stations to the access point. The interference level is also measured, which is the level of interference occurring due to an effect of any other wireless device during a given time. The interference level is based on the absence of signal reception from another BSS while a station in this BSS measures a signal and reports the measurement result to the access point. Thereafter, a new channel conforming to the decision criteria of the access point is selected based on the measure of the received signal strength indication, the packet error rate and the interference level information.

FIG. 2 shows part of the configuration of a conventional wireless communication system (wireless device). A wireless communication system 20 of FIG. 2 includes: a transmit/receive part 23 having a channel measurement section 22 for performing channel measurement; and a host part 21 for receiving measurement results from the channel measurement section 22. Conventionally, measurement of wireless channels is made by a wireless communication system having such a channel measurement section 22.

As a related technology, US 2002/0060995A describes a method for measuring channels to determine a new channel.

Also, IEEE 802.11h examines a technique of measuring the states of wireless channels to dynamically change a channel.

However, although measurement of wireless channels has been discussed in the literature on the channel measurement technology described above, no mention has been made of a specific measurement method (algorithm).

FIG. 13 is a view showing channels available in Japan as of December 2004, while FIG. 14 is a view showing channels available in the U.S. While the number of channels available in Japan is four (5150 to 5250 [MHz]) as shown in FIG. 13, multiple channels (eight channels; 5150 to 5350 [MHz]) are available in North America as shown in FIG. 14. (Note that from May 2005 the eight channels available in North America are also available in Japan.) When the number of available wireless channels is large, the interval required until the same channel is measured next will be long if all of these wireless channels are measured in rotation, causing the problem of increasing the entire measurement time.

SUMMARY OF THE INVENTION

An object of the present invention is providing a specific measurement architecture for shortening the measurement time of available channels.

Specifically, the present invention relates to a wireless device including: a channel measurement section having a function of measuring use states indicating superiority or inferiority of the communication states of two or more wireless channels; and a measuring channel determination section for determining wireless channels to be measured, wherein the measuring channel determination section has a predetermined algorithm for efficiently selecting between a state of measuring all available wireless channels and a state of measuring only some channels among all the available wireless channels.

The wireless device of the present invention is a wireless device having a function of measuring use states indicating superiority or inferiority of the communication states of two or more wireless channels, the device including: a channel measurement section for measuring the use states of the wireless channels; and a measuring channel determination section for determining the wireless channels to be measured and sending a measurement instruction to the channel measurement section, wherein the measuring channel determination section selects between a first state in which only some of all available wireless channels are measured and a second state in which all the available wireless channels are measured according to a predetermined algorithm, and sends the measurement instruction to the channel measurement section.

The wireless channel measurement controller of the present invention is the wireless device described above, wherein the wireless device constitutes a wireless network together with one or more other wireless terminals each having a channel measurement section for measuring the use states of the wireless channels.

In one embodiment of the wireless device of the invention, the measuring channel determination section selects the second state if having detected radio interference in measurement of the currently used wireless channel, and sends the measurement instruction to the channel measurement section.

In another embodiment of the wireless device of the invention, the measuring channel determination section selects the first state according to the predetermined algorithm, in which only odd- or even-numbered wireless channels among all available wireless channels are measured, and sends the measurement instruction to the channel measurement section.

In yet another embodiment of the wireless device of the invention, the measuring channel determination section selects the first state according to the predetermined algorithm, in which odd- or even-numbered channels including the currently used wireless channel among all available wireless channels are measured, and sends the measurement instruction to the channel measurement section, and if having detected radio interference in any of the odd- or even-numbered channels, selects the first state, in which channels adjacent to the interference-detected channel are measured, and sends the measurement instruction to the channel measurement section.

In yet another embodiment of the wireless device of the invention, the wireless device is a wireless channel measurement controller constituting a wireless network together with one or more other wireless terminals each having a channel measurement section for measuring the use states of the wireless channels, and the measuring channel determination section of the wireless channel measurement controller selects between a third state in which only some of all available wireless channels are measured by at least two of the channel measurement section of the wireless channel measurement controller and the channel measurement section of the other wireless terminal and a fourth state in which all the available wireless channels are measured by any two of the channel measurement section of the wireless channel measurement controller and the channel measurement section of the other wireless terminal, according to the predetermined algorithm, and sends the measurement instruction to the channel measurement section of the wireless channel measurement controller and at least one of the channel measurement section of the other wireless terminal.

Alternatively, the wireless device of the present invention is a wireless device having a function of measuring use states indicating superiority or inferiority of the communication states of two or more wireless channels, the device including: a channel measurement section for measuring the use states of the wireless channels; and a measuring channel determination section for determining wireless channels to be measured and sending a measurement instruction to the channel measurement section, wherein the measuring channel determination section selects between a third state in which only some of all available wireless channels are measured by at least two of the channel measurement section and a channel measurement section of one or more other wireless terminals and a fourth state in which all the available wireless channels are measured by any two of the channel measurement section and the channel measurement section of the other wireless terminal, according to the predetermined algorithm, and sends the measurement instruction to at least one of the channel measurement sections of the wireless device itself and the other wireless terminal.

In one embodiment of the wireless device of the invention, the measuring channel determination section makes transition to the first or second state if the other wireless terminal becomes unconnected to the wireless network, and makes transition to the third or fourth state if the other wireless terminal becomes connected to the wireless network, according to the predetermined algorithm.

In another embodiment of the wireless device of the invention, the measuring channel determination section sends the measurement instruction to the channel measurement section of the other wireless terminal belonging to the same wireless network to measure different wireless channels.

In yet another embodiment of the wireless device of the invention, if radio interference is detected in any of the wireless channels measured by the channel measurement sections, the measuring channel determination section sends the measurement instruction to at least one of the channel measurement sections of the wireless channel measurement controller and the other wireless terminal to measure all available wireless channels.

In yet another embodiment of the wireless device of the invention, if radio interference is detected in any of the wireless channels measured by any of the other wireless terminal and none of the other wireless terminal is measuring a channel adjacent to the interference-detected wireless channel, the measuring channel determination section sends the measurement instruction to the other wireless terminal measuring the interference-detected wireless channel to measure the adjacent channel.

In yet another embodiment of the wireless device of the invention, the measuring channel determination section selects the second state according to the predetermined algorithm, stores a wireless channel second best in use state among all wireless channels as a replacement candidate channel for a currently-communicating channel, the second-best wireless channel being determined from the results of measurement made for all the wireless channels in response to the measurement instruction sent from the measuring channel determination section to the channel measurement section, selects the first state according to the predetermined algorithm in which only the currently-communicating channel and the replacement candidate channel are measured, and sends the measurement instruction to the channel measurement section.

In yet another embodiment of the wireless device of the invention, the measuring channel determination section selects the fourth state according to the predetermined algorithm, stores a wireless channel second best in use state among all wireless channels as a replacement candidate channel for a currently-communicating channel, the second-best wireless channel being determined from the results of measurement made for all the wireless channels in response to the measurement instruction sent from the measuring channel determination section to the channel measurement section, selects the third state according to the predetermined algorithm in which only the currently-communicating channel and the replacement candidate channel are measured, and sends the measurement instruction to the channel measurement section.

In yet another embodiment of the wireless device of the invention, the measuring channel determination section selects the second state if radio interference is detected in the replacement candidate channel according to the predetermined algorithm, and sends the measurement instruction to the channel measurement section to instruct the channel measurement section to measure all the available wireless channels.

In yet another embodiment of the wireless device of the invention, the measuring channel determination section selects the fourth state if radio interference is detected in the replacement candidate channel according to the predetermined algorithm, and sends the measurement instruction to the channel measurement section to instruct the channel measurement section to measure all the available wireless channels.

In yet another embodiment of the wireless device of the invention, the measuring channel determination section selects the second state periodically according to the predetermined algorithm and sends the measurement instruction to the channel measurement section, to thereby update the replacement candidate channel periodically.

In yet another embodiment of the wireless device of the invention, the measuring channel determination section selects the fourth state periodically according to the predetermined algorithm and sends the measurement instruction to the channel measurement section, to thereby update the replacement candidate channel periodically.

In yet another embodiment of the wireless device of the invention, the measuring channel determination section sends the measurement instruction to the channel measurement section of the same device so that all available wireless channels or adjacent channels be measured if radio interference is detected in a wireless channel measured by the channel measurement section and that, if an interference-source channel is detected, the first state in which the interference-source channel is not measured be selected.

In yet another embodiment of the wireless device of the invention, the measuring channel determination section sends the measurement instruction to the channel measurement section of the same device so that all available wireless channels or adjacent channels be measured if radio interference is detected in a wireless channel measured by the channel measurement section and that, if an interference-source channel is detected, the third state in which the interference-source channel is not measured be selected.

As described above, according to the present invention, the measuring channel determination section for determining channels to be measured among all available wireless channels sends a measurement instruction to the channel measurement section for measuring wireless channels to measure only some of all wireless channels determined according to a predetermined algorithm. In addition, the measuring channel determination section can select between measurement of only some of all wireless channels and measurement of all available wireless channels. With this measurement of only the minimum number of channels as required, the measurement time can be shortened, and detection of radio interference can be done efficiently.

In particular, according to the present invention, if radio interference is detected in measurement of odd- or even-numbered channels, only channels adjacent to the interference-detected channel are then measured. This enables more efficient channel measurement.

BRIEF DESCRIPTION OF THE DRAWINGS

FIGS. 11A to 11C are views showing examples of measurement of adjacent channels in a BSS area including one wireless channel measurement controller and two wireless terminals in Embodiment 2 of the present invention, in which FIG. 1A shows an example of first measurement, FIG. 11B shows an example of measurement of adjacent channels after occurrence of radio interference, and FIG. 11C shows an example of measurement of all channels after occurrence of radio interference.

DESCRIPTION OF THE PREFERRED EMBODIMENTS

Hereinafter, preferred embodiments of the wireless communication system (wireless device) and the wireless channel measurement controller of the present invention will be described with reference to the accompanying drawings.

Embodiment 1

Embodiment 1 of the present invention will be described with reference to the relevant drawings.

Figure 1:
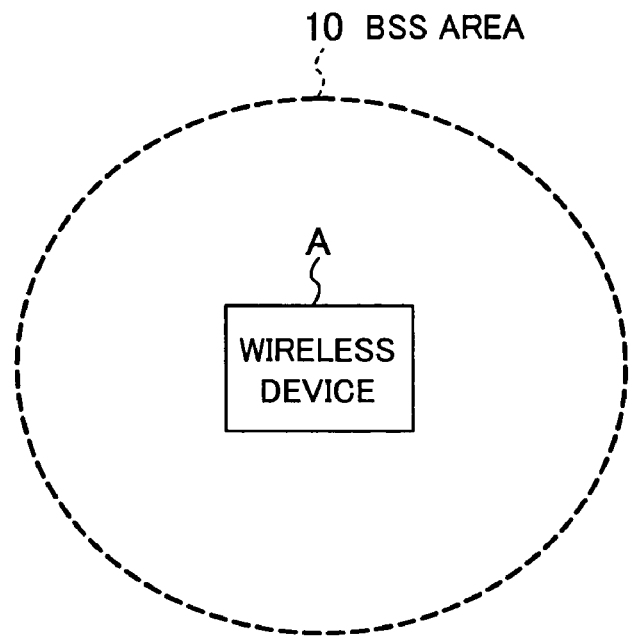
FIG. 1 shows a configuration of a BSS area including one wireless channel measurement controller in Embodiment 1 of the present invention.
Figure 2:
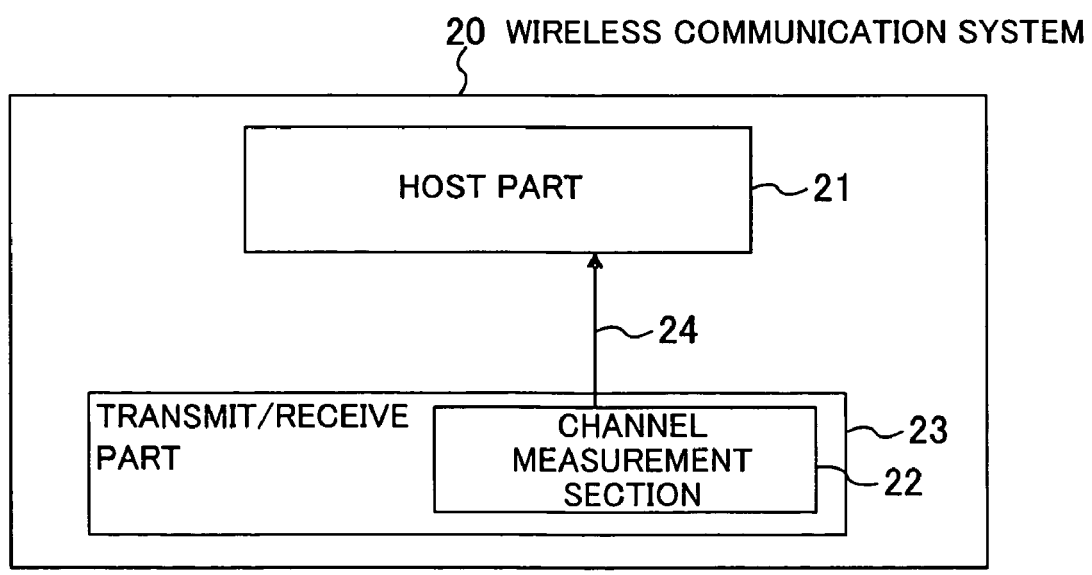
FIG. 2 is a block diagram of a wireless communication system of a conventional wireless terminal.

FIG. 1 is a view illustrating a basic service set (BSS) including only one wireless terminal (wireless device) A within a BSS area 10. In this case, the wireless terminal A functions as a wireless channel measurement controller for determining wireless channels to be measured to execute channel measurement by itself.

Figure 3:
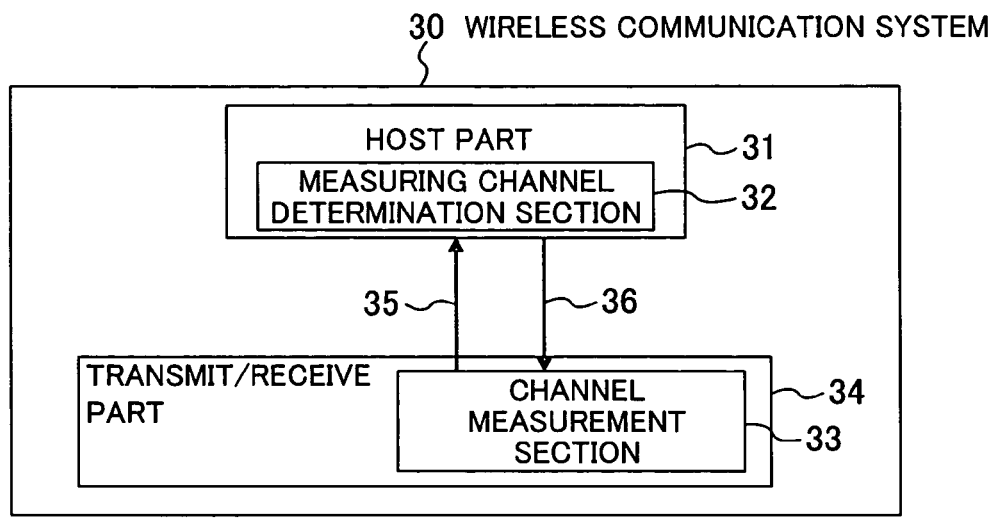
FIG. 3 is a block diagram of a wireless communication system of a wireless channel measurement controller having an algorithm built therein in Embodiment 1 of the present invention.

FIG. 3 is a block diagram of a wireless communication system in this embodiment. The wireless communication system 30 of FIG. 3, which is part of a wireless channel measurement controller, includes: a host part 31 having a measuring channel determination section 32 with a predetermined algorithm built therein for determining channels to be measured; and a transmit/receive part 34 having a channel measurement section 33 for measuring the use states of two or more wireless channels.

The measuring channel determination section 32 requests the channel measurement section 33 to perform channel measurement by sending a measurement instruction 36, and the channel measurement section 33 notifies the host part 31 of the result 35 of measurement made by the channel measurement section 33.

In the wireless communication system 30, switching can be made between a first state, in which the measuring channel determination section 32 instructs the channel measurement section 33 to measure only some of all available channels, and a second state, in which the measuring channel determination section 32 instructs the channel measurement section 33 to measure all available channels, according to a predetermined algorithm. By adopting the first state or the second state properly, the measurement time of all wireless channels can be shortened.

Figure 4:
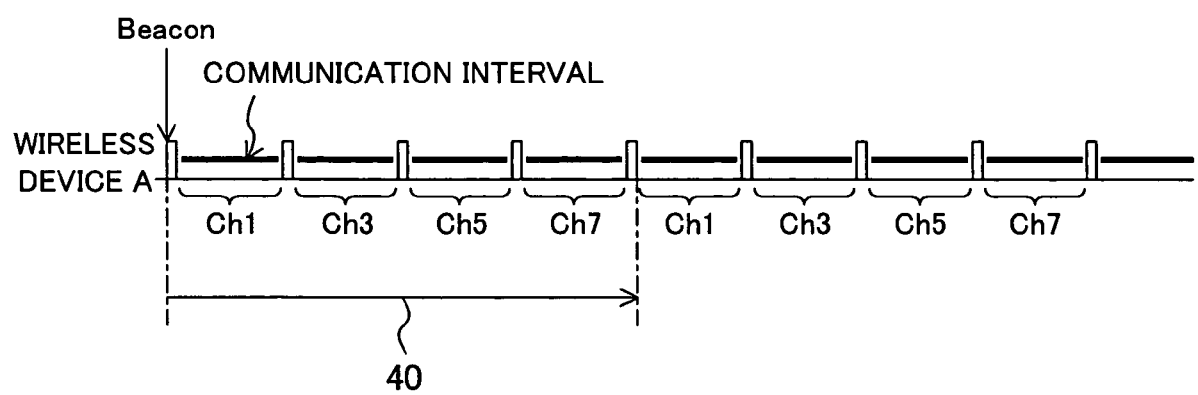
FIG. 4 is a timing chart of measurement of only some of available channels in Embodiment 1 of the present invention.

FIG. 4 is a timing chart showing an example of measurement in the case of adopting the first state, in which some of currently available channels are measured. The beacons in FIG. 4 respectively indicate synchronous information output by the wireless device (wireless channel measurement controller) A in the BSS, with which a wireless device in the BSS can recognize the existence of the access point. As the frequency measurement time period, one beacon is available for only one channel. In the illustrated example, channels Ch1, Ch3, Ch5 and Ch7 are respectively measured within four beacon intervals of a measurement time 40.

Figure 5A:
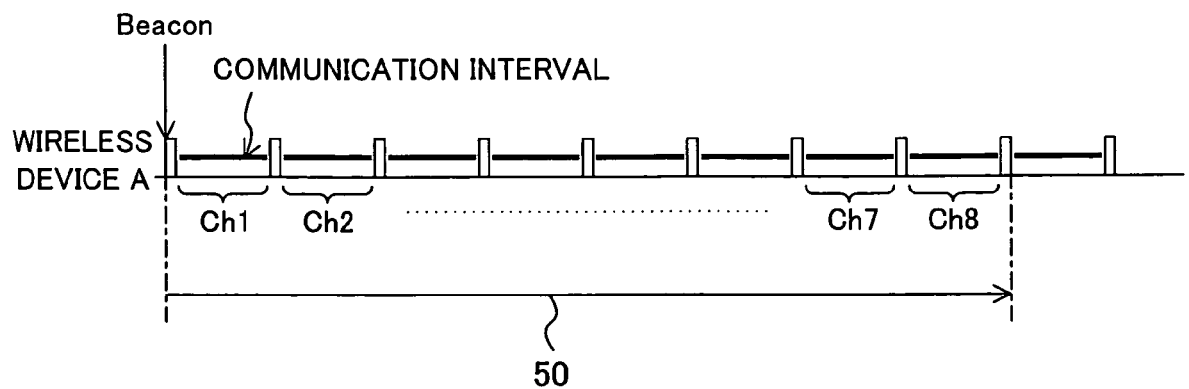
FIG. 5A is a timing chart of measurement of all available wireless channels in Embodiment 1 of the present invention.

FIG. 5A is a timing chart showing an example of measurement in the case of adopting the second state, in which all eight wireless channels, Ch1 through Ch8, are measured. The measurement in the second state will be selected according to a predetermined algorithm in the events of determining a currently used channel at the initial stage and selecting a candidate channel when a shift from the currently used channel is to be made in response to a request from the host. Also, according to a predetermined algorithm, transition may be made to the second state if an abnormal state of radio interference is detected in the first state, so that the channel measurement section 33 can measure all wireless channels to determine a candidate channel to which a shift is to be made.

Figure 13:
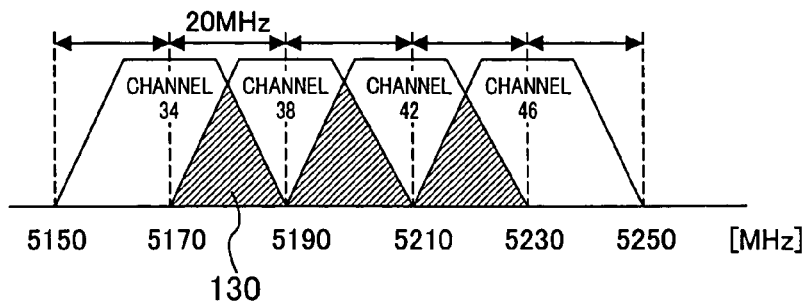
FIG. 13 is a view showing a frequency bandwidth within which wireless channels are available in Japan.
Figure 14:
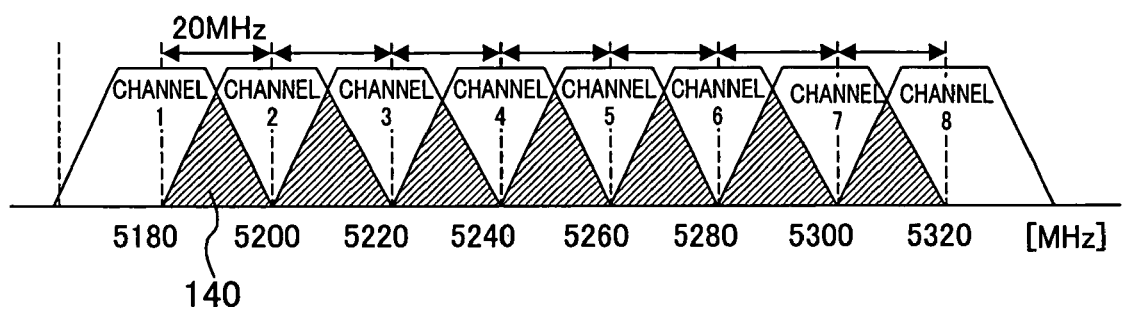
FIG. 14 is a view showing a frequency bandwidth within which wireless channels are available in North America.

FIG. 13 shows channels (four channels) available in Japan, while FIG. 14 shows channels (eight channels) available in the U.S. Hatched portions 130 in FIG. 13 and hatched portions 140 in FIG. 14 represent radio interference caused by adjacent channels. This feature of radio communication of being susceptible to radio interference from adjacent channels is utilized. That is, every other channel is measured (odd- or even-numbered channels are measured), and if no radio interference (interference from an adjacent channel) is detected, it is recognized that the adjacent channels are unused. If all of the eight wireless channels available in North America, for example, are to be measured, a measurement time 50 corresponding to eight beacons will be necessary as shown in FIG. 5A. However, by measuring only some of the channels as shown in FIG. 4, the measurement time can be shortened to the time corresponding to four beacons.

In the measurement in the first state shown in FIG. 4, if the radio interference level exceeds a predetermined level, it can be determined that there is an interference wave from the current channel or an adjacent channel. By use of this fact, reduction in the number of channels to be measured is achieved.

Although only odd-numbered channels were measured in FIG. 4, it is also possible to measure only even-numbered channels. Although one-time measurement was exemplified in FIG. 4, the measurement may be repeated any number of times to enhance the measurement accuracy.

Figure 5B:
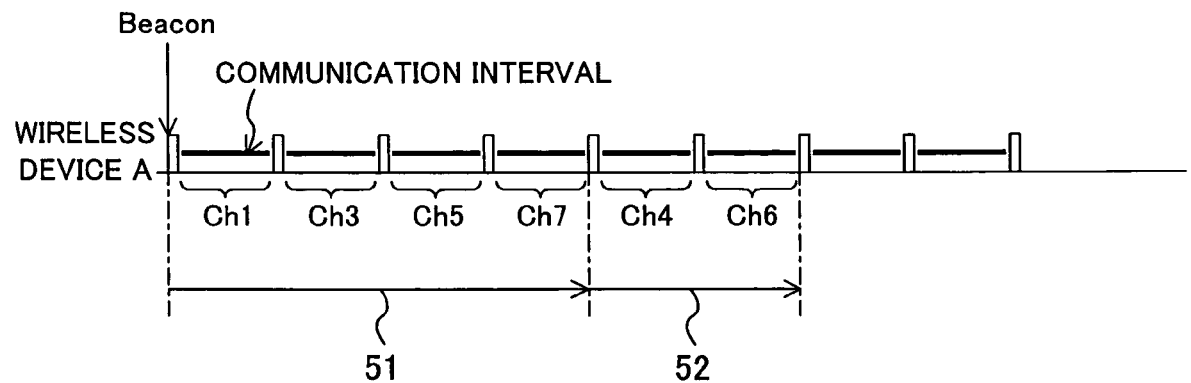
FIG. 5B is a timing chart of measurement of only some of available channels in this embodiment.

FIG. 5B is a timing chart showing detection and measurement of adjacent channels followed when radio interference is detected. FIG. 5B shows the case that interference is detected in the channel Ch5. To specify a channel that is responsible for the radio interference in the channel Ch5, channels Ch4 and Ch6 adjacent to the channel Ch5 are measured. As shown in FIG. 5B, the channels Ch1, Ch3, Ch5 and Ch7 are measured in a measurement time 51 of four beacons and subsequently the channels Ch4 and Ch6 are measured in a measurement time 52 of two beacons. In this way, by use of a predetermined algorithm that odd-numbered channels are first measured and, if radio interference is detected by this measurement, the channels adjacent to the interference-detected channel are measured, correct radio states of wireless channels can be measured.

In the wireless communication system 30 described above, the predetermined algorithm built in the measuring channel determination section 32 may allow transition to the second state at any timing set by the host part 31, such as timing at which the count set by the host part 31 is exceeded, or timing at which the time set by an internal timer in the host part 31 has expired, and instruct the channel measurement section 33 to measure all or other wireless channels.

Embodiment 2

Embodiment 2 of the present invention will be described with reference to the relevant drawings.

Figure 6:
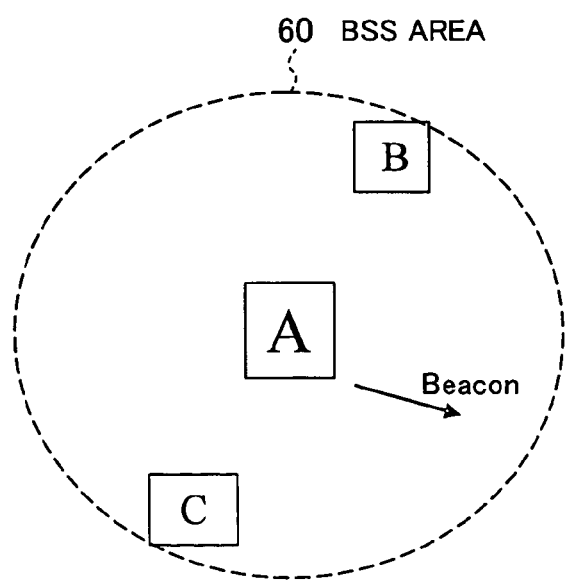
FIG. 6 shows a configuration of a BSS area including one wireless channel measurement controller and two wireless terminals in Embodiment 2 of the present invention.

FIG. 6 is a view illustrating a BSS including three wireless devices (A, B and C) in a BSS area 60.

The wireless device A constituting a wireless network in the BSS area 60 of FIG. 6 functions as a wireless channel measurement controller, while the wireless devices B and C are wireless terminals that do not function as a wireless channel measurement controller. In this situation, in which the wireless terminals B and C exist in the BSS area in addition to the wireless channel measurement controller A, a third state can be defined, in which the measurement of only some of all available wireless channels is shared among the plurality of wireless devices. In this relation, assume that the wireless channel measurement controller A is allowed to request the wireless terminals B and C to perform channel measurement. Note that transition from the first state in the situation shown in FIG. 1 to the third state in the situation shown in FIG. 6 is considered to be state transition when a station is networked in a BSS having an access point.

Figure 7:
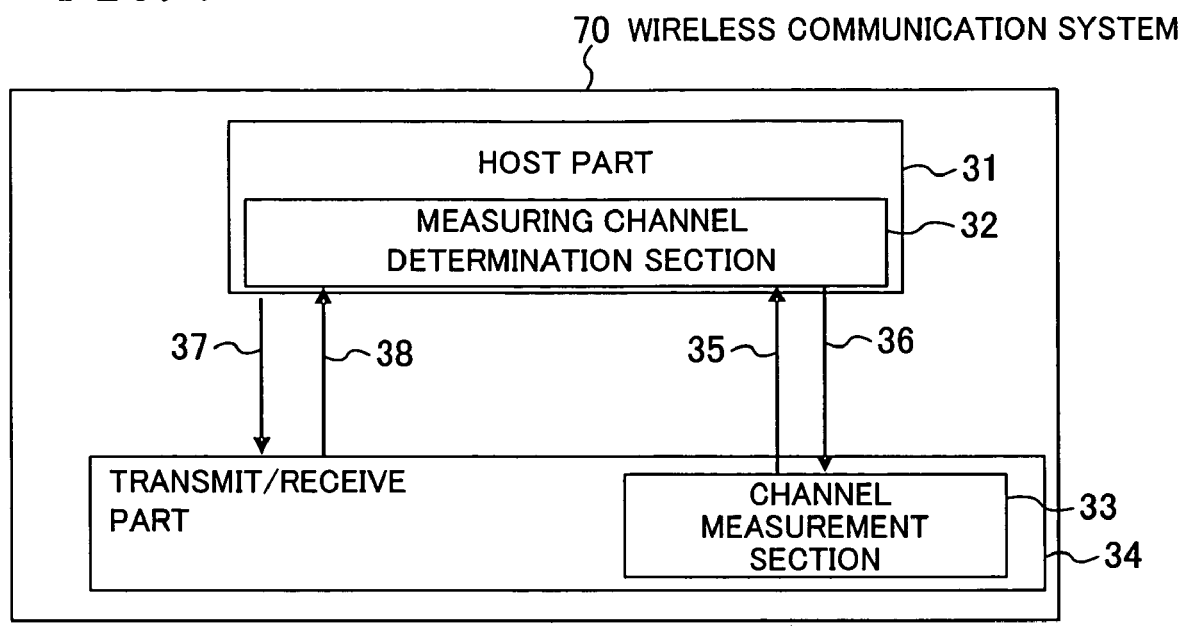
FIG. 7 is a block diagram of a wireless communication system of a wireless channel measurement controller having an algorithm built therein in Embodiment 2 of the present invention.

FIG. 7 is a block diagram of a wireless communication system of the wireless channel measurement controller A in the BSS 60 having three wireless devices (A, B and C) shown in FIG. 6. In the wireless communication system 70 of FIG. 7, the measuring channel determination section 32 of the host part 31 requests the channel measurement section 33 of the same system to measure wireless channels, as in the wireless communication system 30 of FIG. 3. In addition, the wireless communication system 70 of FIG. 7 transmits a measurement request 37 to the other wireless terminals B and C via the transmit/receive part 34, and receives measurement results from the wireless terminals B and C that have done the measurement in response to the measurement request 37 via the transmit/receive part 34 as measurement result reception 38.

Figure 8:
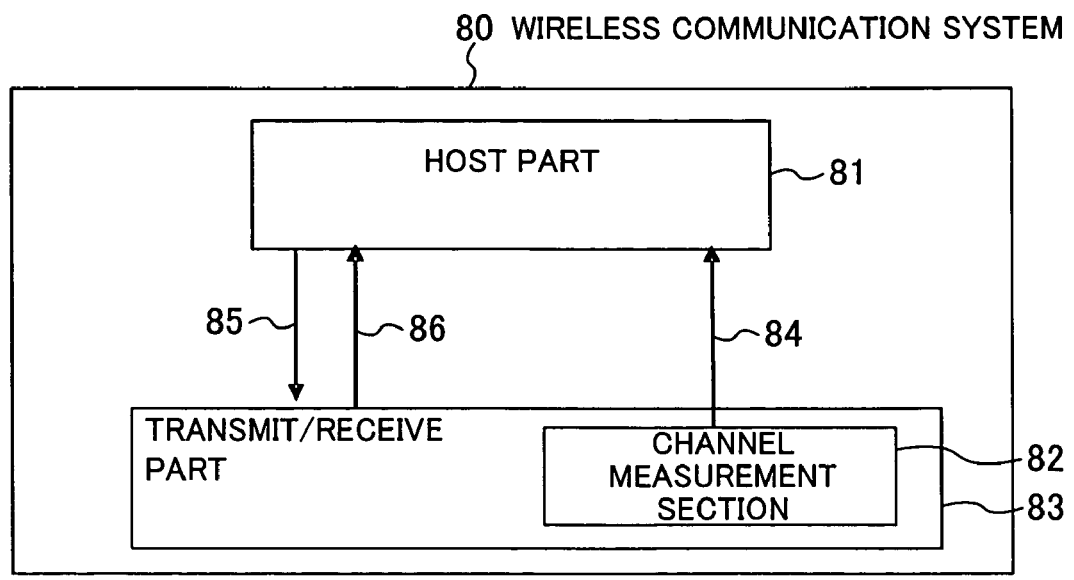
FIG. 8 is a block diagram of a wireless communication system of a wireless terminal in Embodiment 2 of the present invention.

FIG. 8 is a block diagram of a wireless communication system of the wireless terminal B or C in the same BSS 60 area in FIG. 6. The wireless communication system 80 of FIG. 8, essentially composed of a host part 81 and a transmit/receive part 83, has a channel measurement section 82 in the transmit/receive part 83, as in the wireless communication system 70 of FIG. 7, but has no measuring channel determination section in the host part 81. In the wireless communication system 80, the transmit/receive part 83 receives the measurement request 37 transmitted from the wireless communication system 70, and notifies the host part 81 of the measurement request as measurement request reception 86. In response to the notification, the host part 81 instructs the channel measurement section 82 to perform wireless channel measurement and receives a notification 84 of measurement results. The received notification 84 of measurement results is output from the host part 81 to the transmit/receive part 83 as measurement results 85, which are then transmitted to the wireless communication system 70. The measurement results 85 transmitted from the wireless communication system 80 are received by the host part 31 of the wireless communication system 70 of FIG. 7 via the transmit/receive part 34 as the measurement result reception 38.

In the case that only the wireless channel measurement controller A exists in the BSS 60, the measuring channel determination section 32 sends an instruction on measuring channels to the channel measurement section 33, and the channel measurement section 33 notifies the host part 31 of the channel measurement results, as described above with reference to FIG. 3.

Figure 9:
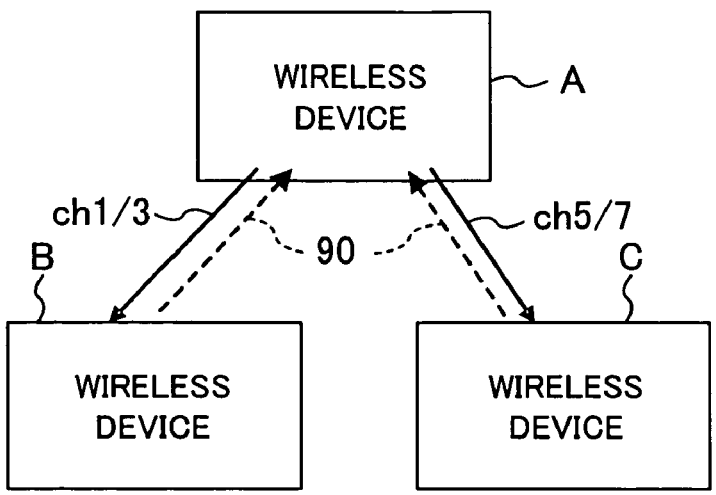
FIG. 9 is a view showing an example of channel measurement in a BSS area including one wireless channel measurement controller and two wireless terminals in Embodiment 2 of the present invention.

FIG. 9 shows an example of channel measurement in which two wireless terminals (B and C) exist in the BSS 60 having one wireless channel measurement controller A shown in FIG. 6. In FIG. 9, the wireless terminal A requests the wireless terminals B and C to measure different channels, like requesting the wireless terminal B to measure the channels Ch1 and Ch3 while requesting the wireless terminal C to measure the channels Ch5 and Ch7, and receives measurement results 90 from the wireless terminals B and C, thereby achieving efficient retrieval of the channel measurement results. Note herein that no importance is especially put on the order of the channels to be measured.

Figure 10:
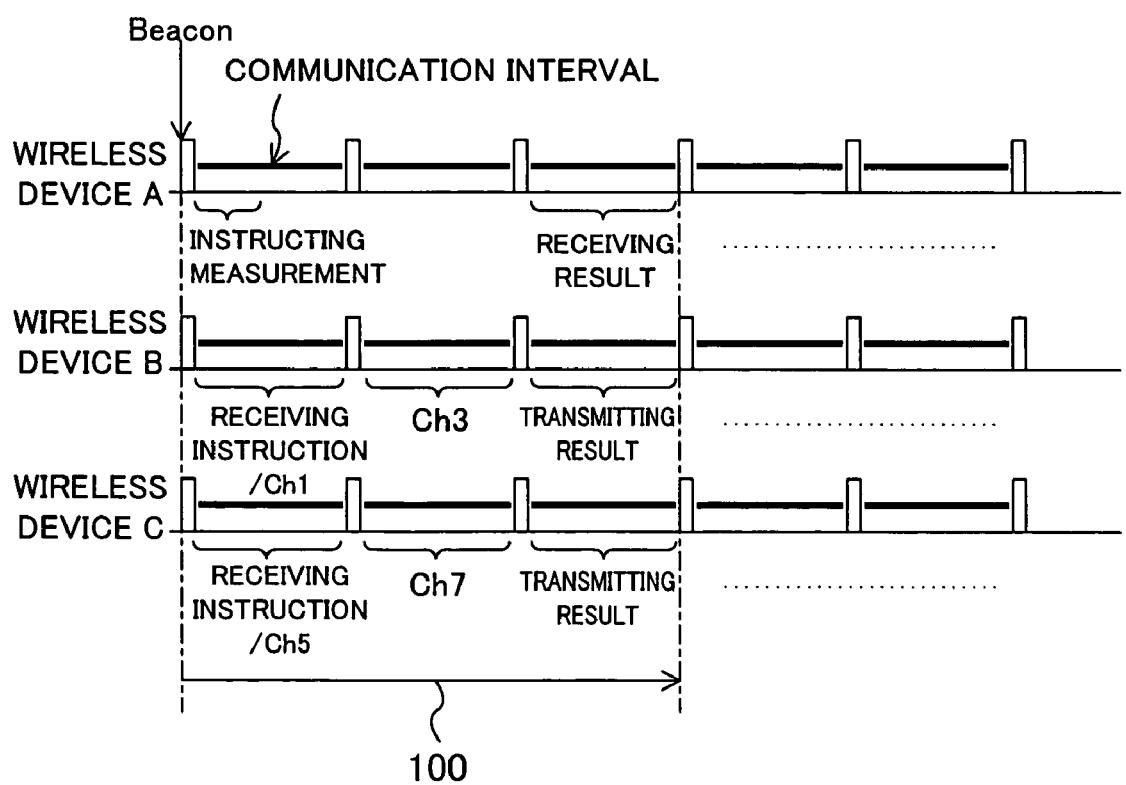
FIG. 10 is a timing chart of channel measurement in Embodiment 2 of the present invention.

FIG. 10 is a timing chart showing the channel measurement in FIG. 9. In FIG. 10, in a measurement time 100 of three beacons, the wireless device (wireless channel measurement controller) A first transmits a measurement instruction to the wireless devices (wireless terminals) B and C during a communication interval following issuance of the first beacon. Receiving the measurement instruction, the wireless terminal B measures the channel Ch1 during the communication interval following the first beacon, measures the channel Ch3 during a communication interval following the second beacon, and finally transmits the measurement results to the wireless channel measurement controller A during a communication interval following the third beacon.

Likewise, receiving the measurement instruction transmitted by the wireless channel measurement controller A, the wireless terminal C measures the channel Ch5 during the communication interval following the first beacon, measures the channel Ch7 during the communication interval following the second beacon, and finally transmits the measurement results to the wireless channel measurement controller A during the communication interval following the third beacon. The wireless channel measurement controller A receives the measurement results transmitted from the wireless terminals B and C during the communication interval following the third beacon.

As described above, when the wireless terminals B and C exist in the BSS in addition to the wireless channel measurement controller A and there are multiple available channels, as in North America, for example, in which eight channels are available, the third state can be selected according to a predetermined algorithm in which channels to be measured are allocated to the plurality of wireless terminals B and C in the BSS to achieve partial channel measurement. In this manner, a piece of measurement that would require the time of eight beacons if being done with one wireless terminal can be completed within the time of three beacons, widely shortening the measurement time.

Although one-time measurement is shown in FIG. 10, the measurement may be made repeatedly any number of times. Although only odd-numbered channels were measured in FIG. 10, only even-numbered channels may be measured. Although the request for measurement was made to all the wireless terminals B, C in the BSS in FIG. 10, it may be made to only some of the wireless terminals in the BSS. In the above description, when there were wireless terminals in the BSS area, the wireless channel measurement controller left the entire channel measurement to the wireless terminals. Alternatively, the wireless channel measurement controller itself may share the channel measurement.

Figure 11A:
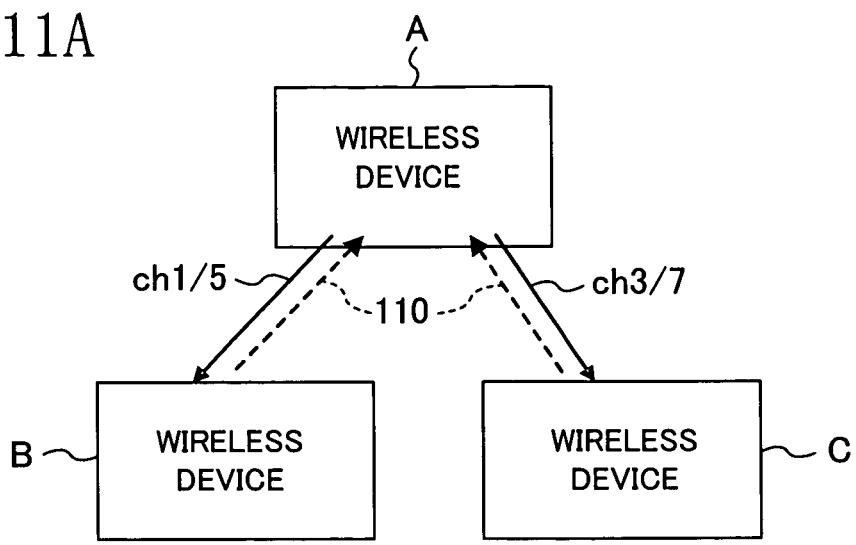

If radio interference is detected in the third state shown in FIGS. 9 and 10, a fourth state may be adopted in which all available channels are measured by sharing. This state is shown in FIGS. 11A and 11C. In FIG. 1A, the wireless channel measurement controller A requests the wireless terminal B to measure the channels Ch1 and Ch5 while requesting the wireless terminal C to measure the channels Ch3 and Ch7. At this time, if it is found from the measurement result 110 transmitted from the wireless terminal B that radio interference has been detected in the channel Ch5, the wireless channel measurement controller A requests the wireless terminal B to measure the channels Ch2/4/1/5 among all available channels while requesting the wireless terminal C to measure the channels Ch6/8/3/7, and receives the measurement results 110 from the wireless terminals B and C.

Figure 20:
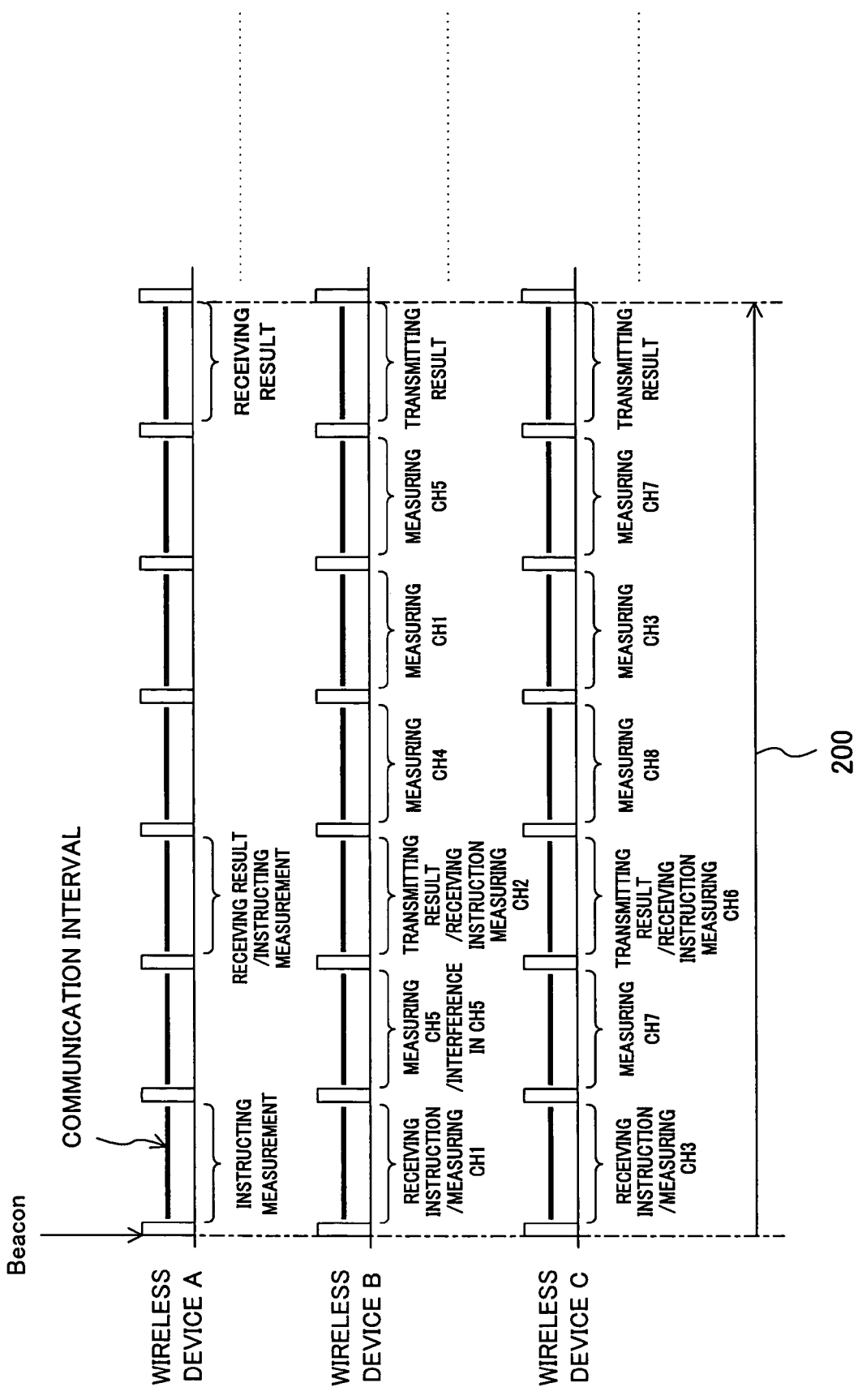
FIG. 20 is a timing chart of channel measurement in Embodiment 2 of the present invention.

FIG. 20 is a timing chart of the processing in FIGS. 11A and 11C. In FIG. 20, the wireless device (wireless channel measurement controller) A first transmits a measurement instruction during the first communication interval. The wireless device (wireless terminal) B, which has received the measurement instruction, measures the channels Ch1 and Ch5 during the two consecutive communication intervals. In the illustrated example, radio interference is detected in the channel Ch5. During the third communication interval, the wireless terminal B transmits the measurement results to the wireless channel measurement controller A. Likewise, the wireless device (wireless terminal) C, which has received the measurement instruction from the wireless channel measurement controller A during the first communication interval, measures the channel Ch3 during the first communication interval and the channel Ch7 during the second communication interval, and transmits the measurement results to the wireless channel measurement controller A during the third communication interval. The wireless channel measurement controller A receives the measurement results from the wireless terminals B and C during the third communication interval, and also transmits a measurement instruction during the third communication interval to request the wireless terminal B to measure the channels Ch2/4/1/5 among all available channels and request the wireless terminal C to measure the channels Ch6/8/3/7. Receiving the measurement instruction, the wireless terminals B and C measure the respective allocated channels over the third through sixth communication intervals, and transmit the measurement results to the wireless channel measurement controller A during the next seventh communication interval. The wireless channel measurement controller A receives the measurement results from the wireless terminals B and C during the seventh communication interval.

As described above, the channel measurement is made according to a predetermined algorithm in which channels to be measured are allocated to a plurality of wireless terminals in the BSS (third state), and if radio interference is detected in any of the channels, all available channels are measured by sharing the measurement among the plurality of wireless terminals (fourth state). Therefore, the total measurement time can be as short as a measurement time 200 of seven beacons even in the event of detection of radio interference. After the fourth state, the third state is recovered to continue the measurement.

The example of measurement described above will be discussed using a flowchart of FIG. 16. The flowchart of FIG. 16 will be described in two parts separately: a flowchart 16A for the case of having only one wireless terminal in a wireless network and a flowchart 16ABC for the case of having a plurality of wireless terminals in addition to the wireless channel measurement controller.

First, in the flowchart 16A, in step S1601, measurement is made for all available wireless channels (second state), to determine the current channel. In step S1602, whether or not other devices (wireless terminals) exist in the same wireless network is determined. If other wireless terminals exist, whether or not a request for measurement is to be made to such wireless terminals is determined in step S1603. If a measurement request is made to such wireless terminals, the process moves to the flowchart 16ABC. If no measurement request is made, or if no other wireless terminal exists, the process proceeds to step S1604, to perform measurement of odd- or even-numbered channels (first state). Once the measurement in the step S1604 is terminated, the process proceeds to step S1605 to determine whether or not the current channel is busy, that is, whether or not the current channel is being used for communication by another wireless network causing radio interference. If it is determined that the current channel is not busy, the process returns to the step S1604 to measure odd- or even-numbered channels. If the current channel is determined busy, the process returns to the step S1601 to start channel determination based on the full channel measurement.

The flowchart 16ABC will then be described. If it is determined to make a measurement request to the other wireless terminals in the step S1603, a measurement request is transmitted from the wireless channel measurement controller to the other wireless terminals (third state) in step S1606 in the flowchart 16ABC. The results of the measurement by the other wireless terminals are then returned in step S1607. The wireless channel measurement controller that has received the measurement results determines whether or not the current channel is busy in step S1608. If the current channel is determined busy, the process returns to the step S1606. If it determined that the current channel is not busy, the process proceeds to step S1609. In the step S1609, whether or not all channels are to be measured is determined. If all channels are to be measured, the wireless channel measurement controller transmits a measurement request to the other wireless terminals to share the measurement of all channels (fourth state) in step S1610. In step S1611, the wireless channel measurement controller receives the results of the measurement done by the other terminals that have received the measurement request. After the fourth state, the process returns to the step S1606 recovering the third state and the measurement is continued.

In the above description, when there were wireless terminals in the BSS area, the wireless channel measurement controller left the entire channel measurement to the wireless terminals. Alternatively, the wireless channel measurement controller itself may share the channel measurement.

Next, the case of measuring adjacent channels if radio interference is detected in the third state shown in FIGS. 9 and 10 will be described with reference to FIGS. 11A and 11B. This case is regarded as the third state because some of available channels are measured by sharing.

In FIG. 11A, the wireless channel measurement controller A requests the wireless terminal B to measure the channels Ch1 and Ch5 while requesting the wireless terminal C to measure the channels Ch3 and Ch7. At this time, if it is found from the measurement results 110 from the wireless terminal B that radio interference has been detected in the channel Ch5, the wireless channel measurement controller A requests the wireless terminals B and C to measure the adjacent channels Ch4 and Ch6, respectively, and receives the measurement results 110 from the wireless terminals B and C.

Figure 11B:
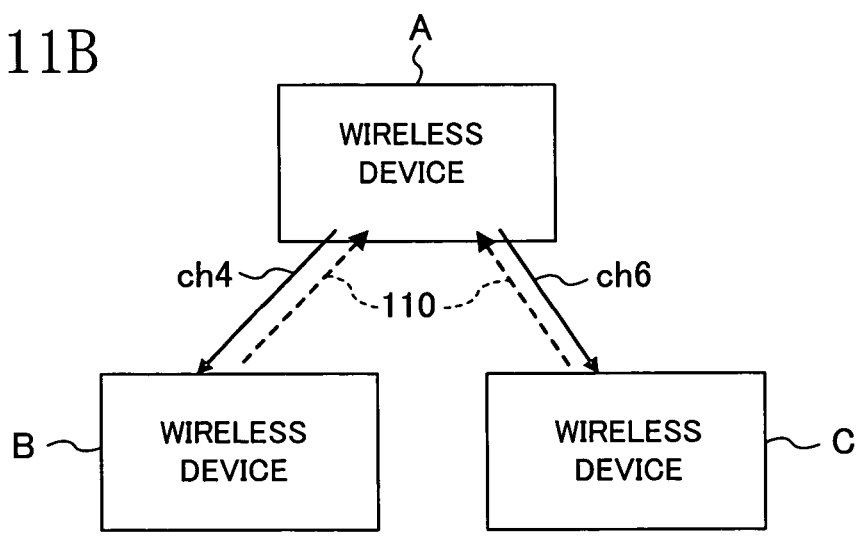
Figure 11C:
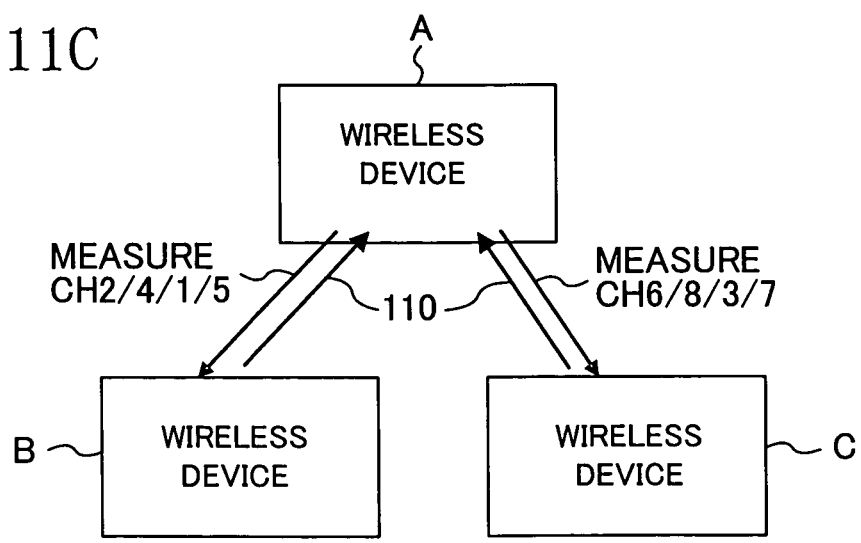
Figure 12:
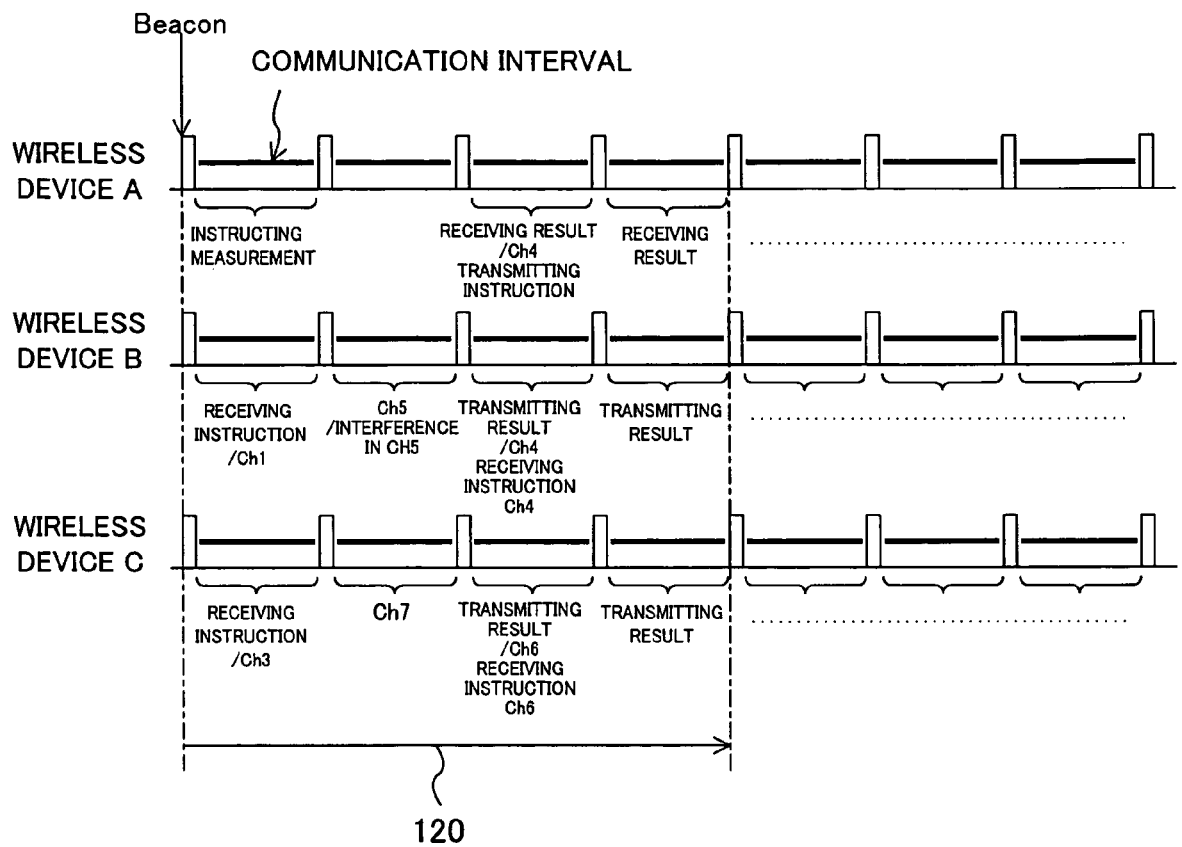
FIG. 12 is a timing chart of channel measurement in Embodiment 2 of the present invention.

FIG. 12 is a timing chart of the processing in FIGS. 11A and 11B. In FIG. 12, the wireless device (wireless channel measurement controller) A first transmits a measurement instruction during the first communication interval. The wireless device (wireless terminal) B, which has received the measurement instruction, measures the channels Ch1 and Ch5 during the two consecutive communication intervals. In the illustrated example, radio interference is detected in the channel Ch5. During the third communication interval, the wireless terminal B transmits the measurement results to the wireless channel measurement controller A. Likewise, the wireless device (wireless terminal) C, which has received the measurement instruction from the wireless channel measurement controller A during the first communication interval, measures the channel Ch3 during the first communication interval and the channel Ch7 during the second communication interval, and transmits the measurement results to the wireless channel measurement controller A during the third communication interval. The wireless channel measurement controller A receives the measurement results from the wireless terminals B and C during the third communication interval, and also transmits a measurement instruction during the third communication interval to request the wireless terminal B to measure the channel Ch4 adjacent to the interference-detected channel Ch5 and the wireless terminal C to measure the channel Ch6 as the other adjacent channel. Receiving the measurement instruction, the wireless terminals B and C measure the respective assigned channels during the third communication interval, and transmit the measurement results to the wireless channel measurement controller A during the next fourth communication interval. The wireless channel measurement controller A receives the measurement results from the wireless terminals B and C during the fourth communication interval.

Thus, partial channel measurement according to a predetermined algorithm is made in which channel measurement is made by allocating channels to be measured to a plurality of wireless terminals in the BSS (third state) and, if radio interference is detected in any of the channels, channels adjacent to the interference-detected channel on both sides are measured by further allocating the adjacent channels to the wireless terminals. In this manner, the total measurement time can be as short as a measurement time 120 of four beacons even in the event of detection of radio interference. Alternatively, for improvement of the measurement accuracy of radio interference, the terminal that has detected the radio interference may be instructed to measure the adjacent channels.

As described above, when wireless terminals other than the wireless channel measurement controller exist in the BSS area, the wireless channel measurement controller can request the wireless terminals to perform channel measurement to shorten the measurement time.

The example of measurement described above will be discussed using the flowchart of FIG. 16.

If it is determined to make a measurement request to the other wireless terminals in the step S1603 in the flowchart 16A, a measurement request is transmitted from the wireless channel measurement controller to the other wireless terminals (third state) in the step S1606 in the flowchart 16ABC. The results of the measurement by the wireless terminals are then returned in the step S1607. The wireless channel measurement controller that has received the measurement results determines whether or not the current channel is busy in the step S1608. If the current channel is determined busy, the process returns to the step S1606. If it is determined that the current channel is not busy, the process proceeds to the step S1609. In the step S1609, whether or not all channels are to be measured is determined. If all channels are not to be measured, whether or not adjacent channels (predetermined channels) are to be measured is determined in step S1612. If adjacent channels are not to be measured, the process returns to the step S1606. Otherwise, the process proceeds to step S1613. In the step S1613, the wireless channel measurement controller transmits a measurement request to the other wireless terminals to perform measurement of adjacent channels (third in-depth state) in step S1613. In the step S1611, the wireless channel measurement controller receives the results of the measurement done by the other terminals that have received the measurement request. After the third in-depth state, the process returns to the step S1606 recovering the third state and the measurement is continued.

In the above description, when there were wireless terminals in the BSS area, the wireless channel measurement controller left the entire channel measurement to the wireless terminals. Alternatively, the wireless channel measurement controller itself may share the channel measurement.

Embodiment 3

Next, a channel selection method for selecting the minimum number of channels to be measured will be described.

In this embodiment, in the wireless channel measurement controller having the wireless communication system 70 of FIG. 7, the channel measurement section 33 is instructed to measure all channels (second state), and a channel second best in measurement results is stored in the measuring channel determination section 32 as a replacement candidate channel. In the next measurement, precedence is given to the second-best replacement candidate channel (first state), rather than measuring all channels. In this way, the measurement time for all wireless channels can be shortened.

Figure 15:
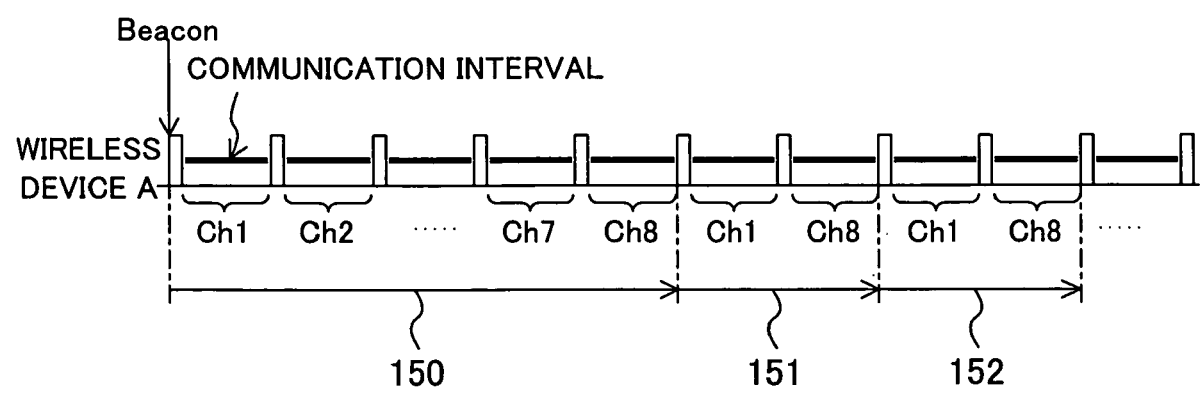
FIG. 15 is a view showing an example of measurement of the current channel and the second best replacement candidate channel in Embodiment 3 of the present invention.
Figure 17:
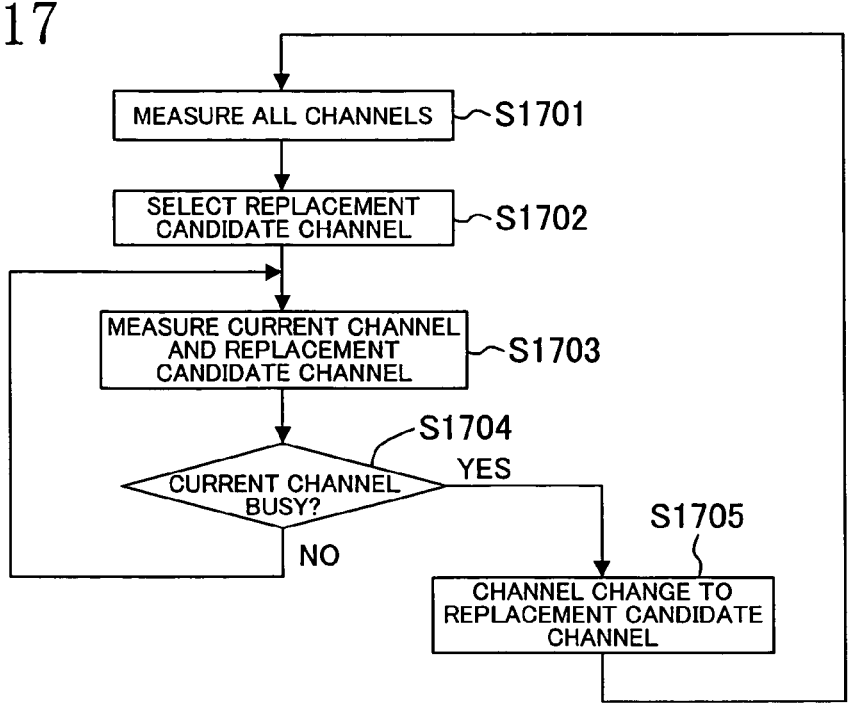
FIG. 17 is a flowchart showing an algorithm in Embodiment 3 of the present invention.

FIG. 15 is a timing chart of the operation described above. In the case of having available channels as many as eight channels as in North America, all wireless channels are first measured in a measurement time 150. Thereafter, only the current channel (channel Ch1 in this example) and the second-best channel (channel Ch8 in this example), among the eight channels, are measured in a measurement time 151. This can shorten the measurement time to the time of two beacons. Although the measurement of the two channels Ch1 and Ch8 was made only twice in the measurement times 151 and 152 in FIG. 15, it can be made repeatedly any number of times to improve the measurement accuracy. FIG. 17 shows a flowchart of this processing.

In FIG. 17, in step S1701, all wireless channels are measured (second state). In step S1702, a channel second best among all the wireless channels is selected as a replacement candidate. In step S1703, measurement is made for the two channels: the current channel and the replacement candidate channel (first state). In step S1704, whether or not the current channel is busy is determined. If it is determined that the current channel is not busy, the process returns to the step S1703 for channel measurement. If the current channel is determined busy, the process proceeds to step S1705 to replace the current channel with the replacement candidate channel. The process then returns to the step S1701 for measurement of all wireless channels, to select a new replacement candidate channel. In this manner, measurement of all wireless channels is initially performed, and based on the measurement results, the wireless channel second best to the currently communicating channel in communication state (use state) is stored as the replacement candidate channel. As long as no radio interference occurs in the current channel, measurement of the two channels is repeated in the steps S1703 and S1704. By using such a predetermined algorithm, the measurement time can be shortened.

Although the wireless channel measurement controller performed the measurement in the illustrated example, it may request a wireless terminal in the BSS to perform the measurement.

Figure 18:
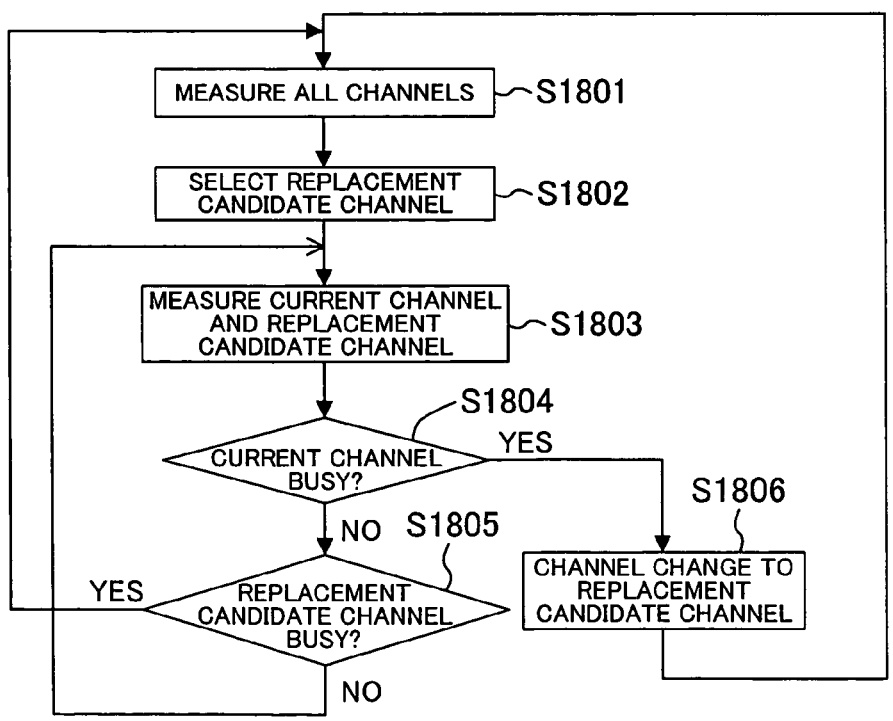
FIG. 18 is a flowchart showing another algorithm in Embodiment 3 of the present invention.

As an another example of processing, in the wireless channel measurement controller having the wireless communication system 70 of FIG. 7, the channel measurement section 33 is instructed to measure all channels, and a channel second best in the measurement results is stored in the measuring channel determination section 32 as a replacement candidate channel. In this example, all wireless channels will be measured not only when radio interference occurs in the current channel, but also when radio interference occurs in the second-best replacement candidate channel. This allows for holding of an always-updated replacement candidate channel, and thus can shorten the measurement time of all wireless channels. FIG. 18 is a flowchart of this processing.

The flowchart of FIG. 18 is substantially the same as the flowchart of FIG. 17 in the processing in steps S1801 through S1804 and S1806, but is different therefrom in that if it is determined that the current channel is not busy in the step S1804, whether or not the replacement candidate channel is busy is further determined in step S1805. If the replacement candidate channel is determined busy in the step S1805, the process returns to the step S1801 for measurement of all wireless channels to select a new replacement candidate channel. If it is determined that the replacement candidate channel is not busy in the step S1805, the process returns to the step S1803 to continue the measurement of the current channel and the current replacement candidate channel. In this manner, measurement of all wireless channels is initially made, and based on the measurement results, a wireless channel second best to the currently communicating channel in communication state (use state) is stored as a replacement candidate channel. As long as no radio interference occurs in the current channel and the replacement candidate channel, the measurement of the two channels is repeated in the processing in the steps S1803 through S1805. By adopting such a predetermined algorithm, the measurement time can be shortened.

Figure 19:
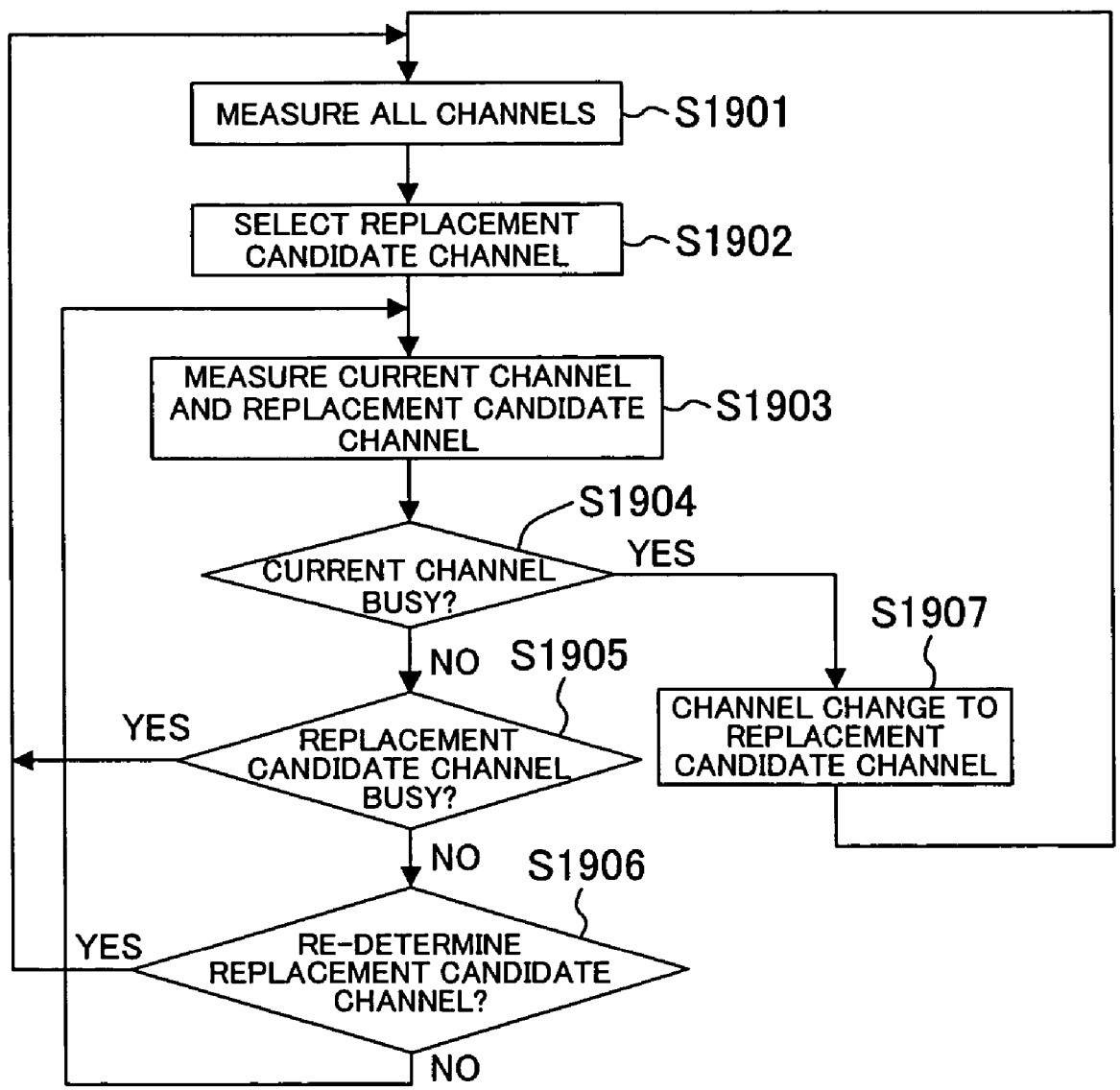
FIG. 19 is a flowchart showing yet another algorithm in Embodiment 3 of the present invention.

As yet another example of processing, in the wireless channel measurement controller having the wireless communication system 70 of FIG. 7, the channel measurement section 33 is instructed to measure all channels, and a channel second best in the measurement results is stored in the measuring channel determination section 32 as a replacement candidate channel. In this example, the measurement of all channels is made periodically, to enable holding of an always-updated replacement candidate channel. This can shorten the measurement time of all wireless channels. FIG. 19 is a flowchart showing this processing.

The flowchart of FIG. 19 is substantially the same as the flowchart of FIG. 17 in the processing in steps S1901 through 1904 and S1907, but is different therefrom in the processing after the determination that the current channel is not busy in the step S1904. Specifically, after the step S1904 of determining whether or not the current channel is busy, whether or not the replacement candidate channel is busy is determined in step S1905. If the replacement candidate channel is determined busy, the process returns to the step S1901 for selection of a new replacement candidate. If it is determined that the replacement candidate channel is not busy, process proceeds to step S1906 to decide whether or not the replacement candidate is to be re-determined. If re-determination is decided, the process returns to the step S1901. Otherwise, the process returns to the step S1903 to continue the measurement of the current channel and the current replacement candidate channel. In this manner, measurement of all wireless channels is initially made, and based on the measurement results, a wireless channel second best to the currently communicating channel in communication state (use state) is stored as the replacement candidate channel. As long as no radio interference occurs in the current channel or the replacement candidate channel, the measurement of the two channels is repeated in the processing in the steps S1903 through S1906. In addition, whether or not re-determination is to be made for a better replacement candidate is determined even if no radio interference occurs in the current replacement candidate channel. By adopting such a predetermined algorithm, an always-updated replacement candidate channel can be held.

Embodiment 4

Figure 22:
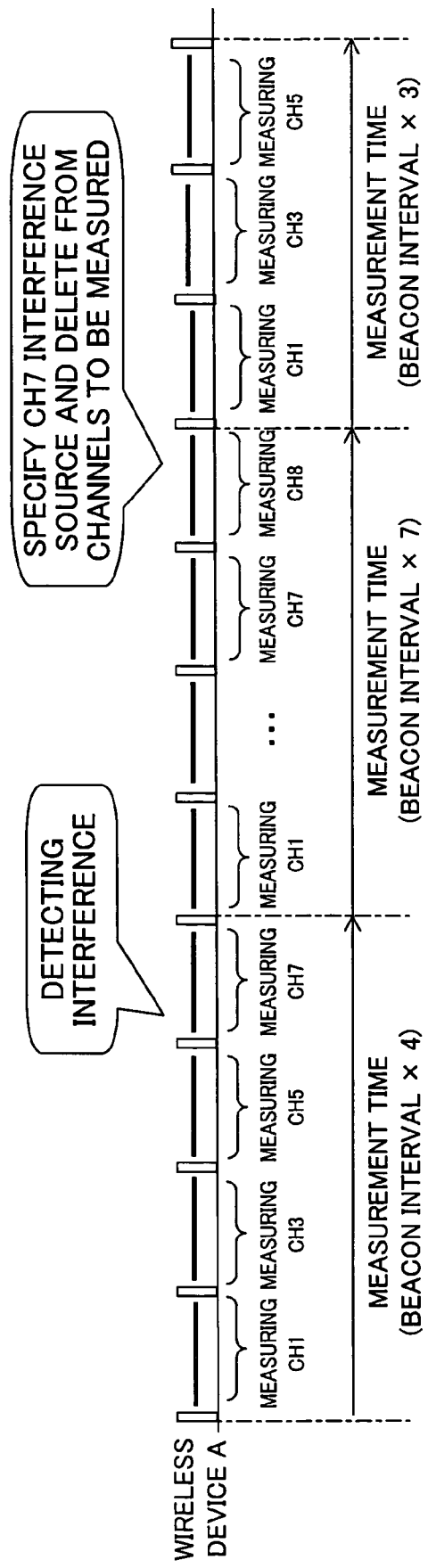
FIG. 22 is a timing chart of channel measurement in Embodiment 4 of the present invention.

A measurement method using an algorithm different from that used in Embodiment 2 will be described as Embodiment 4 with reference to the relevant drawings. FIG. 22 is a timing diagram of this measurement method.

In FIG. 22, only the wireless device (wireless channel measurement controller) A performs measurement of the channels Ch1/3/5/7. In the illustrated example, radio interference is detected in the channel Ch7, and during the subsequent fifth through thirteenth communication intervals, all the channels Ch1 to Ch8 are measured. Once the channel Ch7 is specified as the interference source, the channels Ch1/3/5 excluding Ch7 are then measured. In this manner, if radio interference is detected in any of the channels in the first state, measurement of all available channels is made (second state). Once the interference source is specified, the specified channel is no more measured. By adopting such a predetermined algorithm, channel measurement in the first state with a reduced number of channels can be made.

In the timing chart described above, all the channels were measured after detection of radio interface. Alternatively, only channels adjacent to the interference-detected channel may be measured to specify an interference-source channel.

Figure 21:
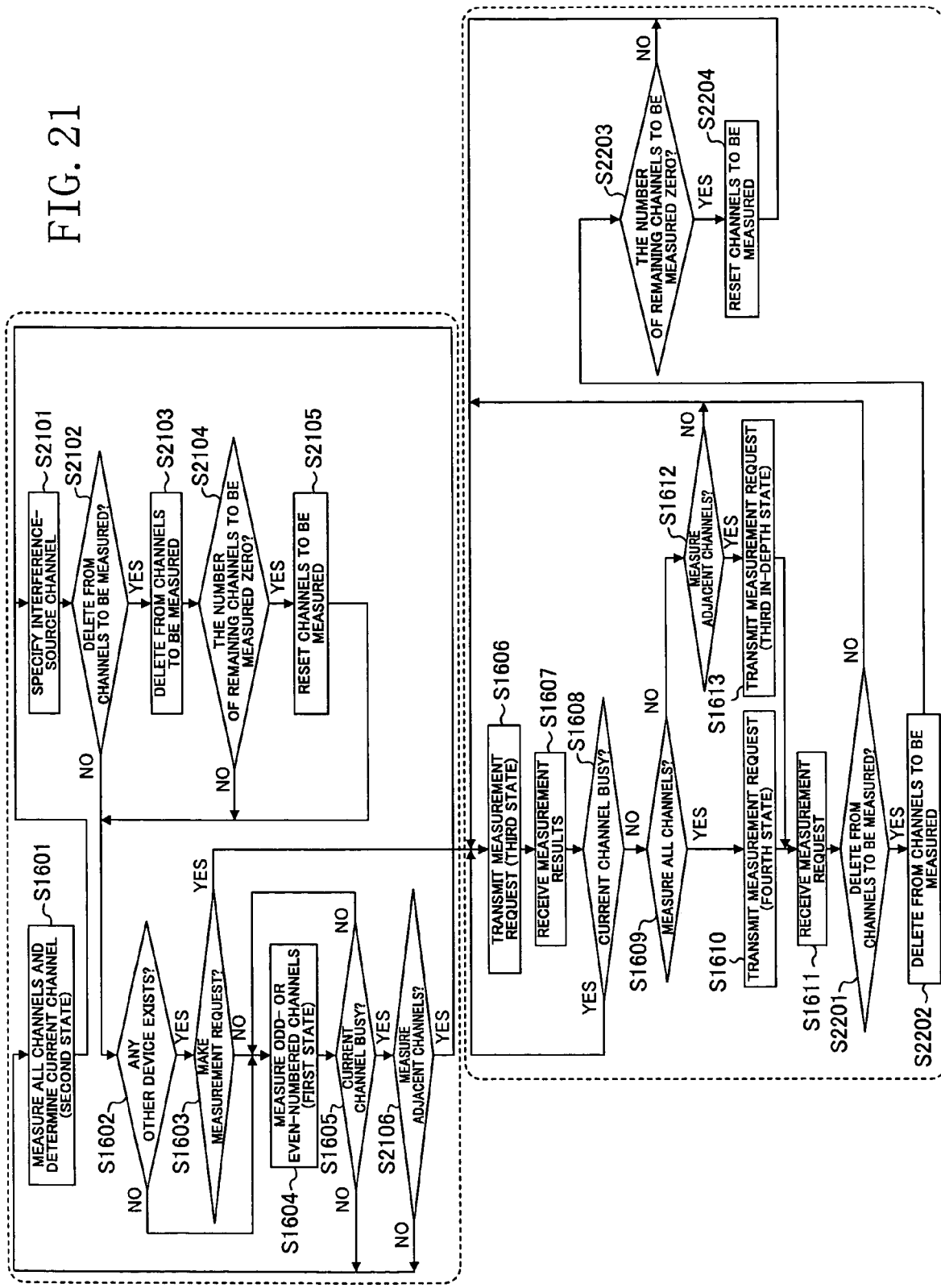
FIG. 21 is a flowchart showing an algorithm in Embodiment 4 of the present invention.

In FIG. 22, only one-time measurement is shown. Alternatively, to enhance the measurement accuracy, the measurement may be made repeatedly a plurality of times. FIG. 21 is a flowchart showing this processing. In the flowchart of FIG. 21, the steps S1601 through S1605 are substantially the same as those in the flowchart of FIG. 16. After the measurement of all channels in the step S1601, if a given channel is specified as a radio interference source in step S2101, whether or not the interference-source channel should be deleted from the channels to be measured is determined in step S2102. If deletion is determined, the interference-source channel is deleted from the channels to be measured in step S2103 and then whether or not there is left any channel to be measured is determined in step S2104. If there is left, the process returns to the step S1602. Otherwise, the channels to be measured are reset to include any deleted channel and the process returns to the step S1602.

Embodiment 5

Figure 23:
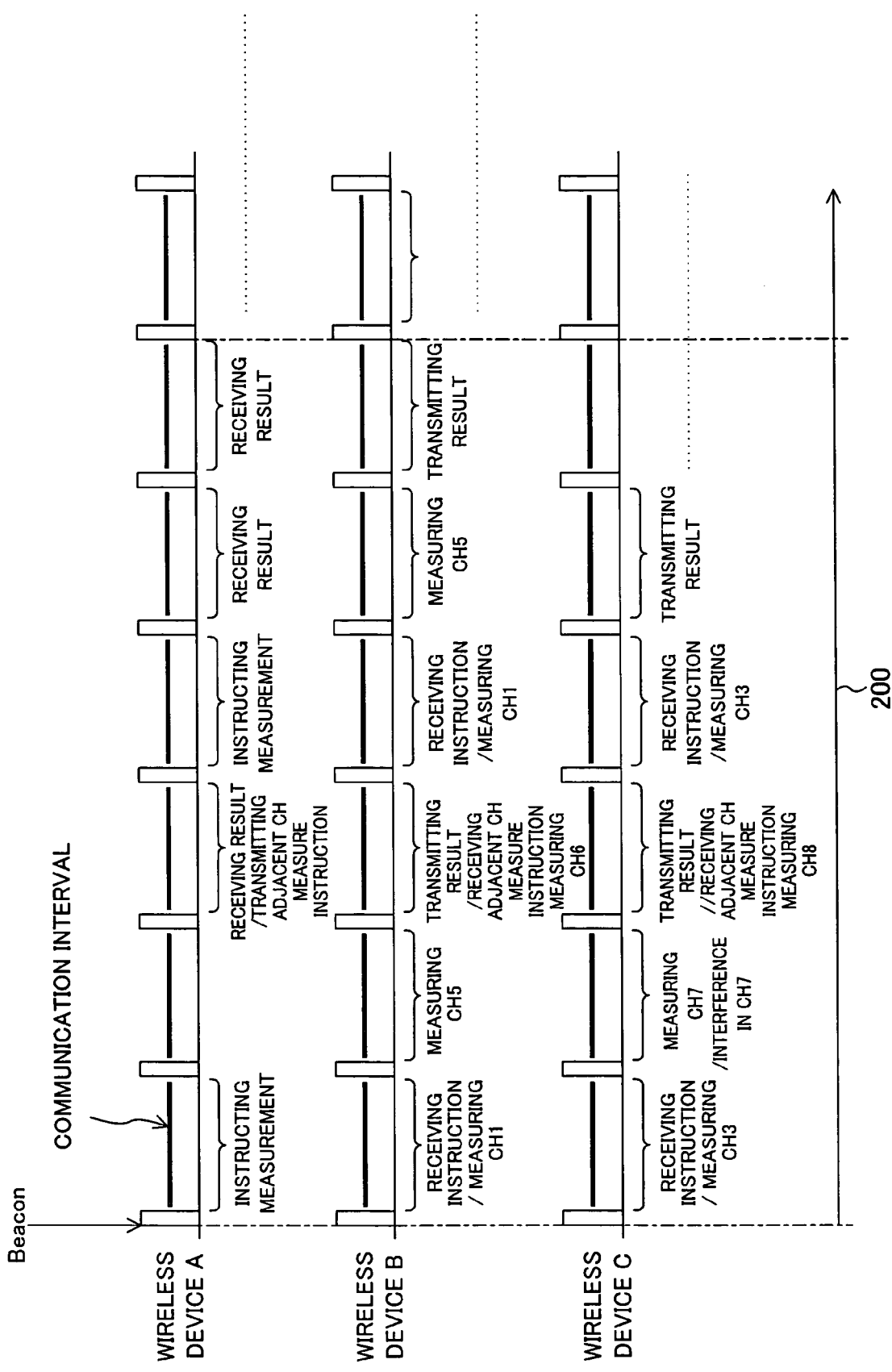
FIG. 23 is a timing chart of channel measurement in Embodiment 5 of the present invention.

A measurement method using an algorithm different from that used in Embodiment 2 in the case of existence of wireless terminals will described as Embodiment 5 with reference to the relevant drawing. FIG. 23 is a timing diagram of this measurement method.

In FIG. 23, the wireless device (wireless channel measurement controller) A first transmits a measurement instruction during the first communication interval. The wireless device (wireless terminal) B, which has received the measurement instruction, measures the channels Ch1 and Ch5 during the two consecutive communication intervals. During the third communication interval, the wireless terminal B transmits the measurement results to the wireless channel measurement controller A. Likewise, the wireless device (wireless terminal) C, which has received the measurement instruction from the wireless channel measurement controller A during the first communication interval, measures the channel Ch3 during the first communication interval and the channel Ch7 during the second communication interval. In the illustrated example, radio interference is detected in the channel Ch7. During the third communication interval, the wireless terminal C transmits the measurement results to the wireless channel measurement controller A. The wireless channel measurement controller A receives the measurement results from the wireless terminals B and C during the third communication interval, and also transmits a measurement instruction to request the wireless terminal B to measure the channel Ch6 adjacent to the interference-detected channel Ch7 and the wireless terminal C to measure the channels Ch8 as the other adjacent channel. Receiving the measurement instruction, the wireless terminals B and C measure the respective assigned channels during the third communication interval, and transmits the measurement results to the wireless channel measurement controller A during the next fourth communication interval. The wireless channel measurement controller A receives the measurement results from the wireless terminals B and C during the fourth communication interval.

Once the channel Ch7 is determined as an interference-source channel as a result of the measurement, the interference-source channel is deleted from the channels to be measured for the subsequent channel measurement. Specifically, the wireless device (wireless channel measurement controller) A transmits a measurement instruction during the fourth communication interval. The wireless device (wireless terminal) B measures the channels Ch1 and Ch5 during the two consecutive communication intervals, and then transmits the measurement results to the wireless channel measurement controller A during the sixth communication interval. The wireless device (wireless terminal) C measures the channel Ch3 during the fourth communication interval in response to the measurement instruction from the wireless channel measurement controller A, and then transmits the measurement results to the wireless channel measurement controller A during the subsequent fifth communication interval.

As described above, if radio interference is detected in any channel in the third state, measurement of channels adjacent to the interference-detected channel is made by sharing. Once the interference-source channel is specified, the specified channel is no more measured. By adopting such a predetermined algorithm, channel measurement in the third state with a reduced number of channels can be made.

In the timing chart of FIG. 23, only the adjacent channels are measured after detection of radio interference. Alternatively, all the channels may be measured after detection of radio interference. Also, to enhance the measurement accuracy, the terminal that has detected the radio interference may be instructed to measure the adjacent channels.

In this embodiment, only the wireless terminals perform the channel measurement. Alternatively, the wireless channel measurement controller may also share the measurement. The above processing is shown in the flowchart of FIG. 21.

Figure 16:
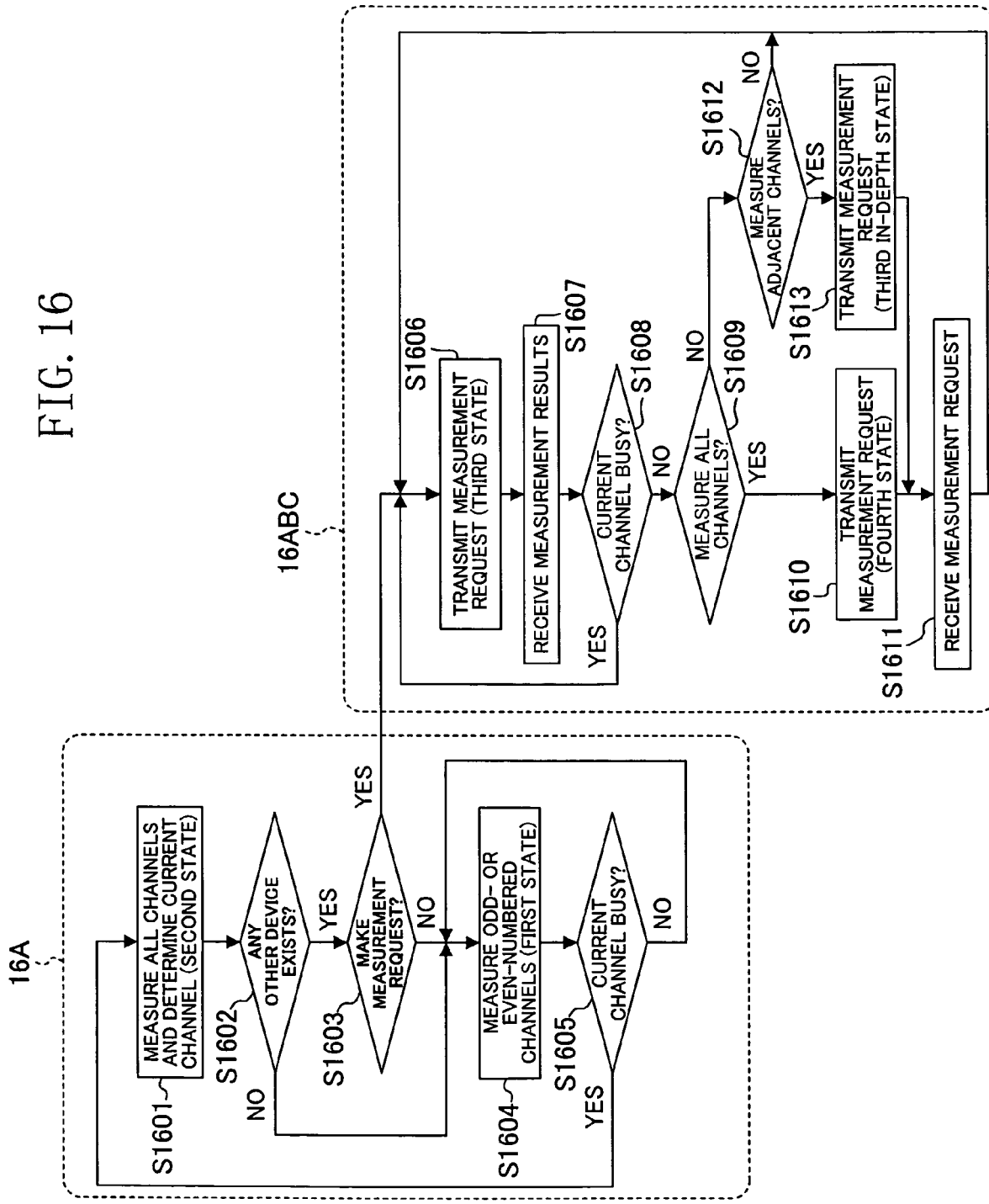
FIG. 16 is a flowchart showing an algorithm in Embodiment 2 of the present invention.

In the flowchart of FIG. 21, the steps S1601 through S1613 are substantially the same as those in the flowchart of FIG. 16. If measurement of all channels is determined in the step S1609 after radio interference is detected in the current channel in the step S1608, the wireless channel measurement controller transmits a measurement request to the other wireless terminals to share the measurement of all channels in the step S1610, and receives the measurement results in the step S1611. If all channels are not to be measured in the step S1609, whether or not adjacent channels are to be measured is determined in the step S1612. If adjacent channels are to be measured, the wireless channel measurement controller transmits a measurement request to the other wireless terminals to perform measurement of adjacent channels in the step S1613, and receives the measurement results in the step S1611.

After the interference-source channel is specified from the received results, whether or not the interference-source channel should be deleted from the channels to be measured is determined in step S1620. If deletion is determined, the interference-source channel is deleted from the channels to be measured in step S2202, and then whether or not there is left any channel to be measured in step S2203. If there is left, the process returns to the step S1606 to recover the third state. Otherwise, the channels to be measured are reset to include any deleted channel and the process returns to the step S1606 to recover the third state.

As described above, if radio interference is detected in any channel in the third state, measurement of channels adjacent to the interference-detected channel is made by sharing. Once the interference-source channel is specified, the specified channel is no more measured. By adopting such a predetermined algorithm, channel measurement in the third state with a reduced number of channels can be done.

In the timing chart of FIG. 23, only the adjacent channels were measured after detection of radio interference. Alternatively, all the channels may be measured after detection of radio interference. Also, in FIG. 23, only one-time measurement is shown. To enhance the measurement accuracy, naturally, the measurement may be made repeatedly a plurality of times. To further enhance the measurement accuracy, the terminal that has detected the radio interference may be instructed to measure the adjacent channels.

In this embodiment, only the wireless terminals performed the channel measurement. Alternatively, the wireless channel measurement controller may also share the measurement.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A wireless device having a function of measuring use states indicating superiority or inferiority of the communication states of two or more wireless channels, the device comprising:

a channel measurement section for measuring the use states of the wireless channels; and a measuring channel determination section for determining the wireless channels to be measured and sending a measurement instruction to the channel measurement section, wherein the measuring channel determination section selects between a first state in which only more than one of all available wireless channels are measured and a second state in which all the available wireless channels are measured according to a predetermined algorithm, and sends the measurement instruction to the channel measurement section, and each of the available wireless channels to be measured in the first state is not adjacent to all other of the available wireless channels to be measured in the first state.

2. A wireless channel measurement controller comprising the wireless device of claim 1, wherein the wireless device constitutes a wireless network together with one or more other wireless terminals each having a channel measurement section for measuring the use states of the wireless channels.

3. The device of claim 1, wherein the measuring channel determination section selects the second state if having detected radio interference in measurement of the currently used wireless channel, and sends the measurement instruction to the channel measurement section.

4. The device of claim 1, wherein the measuring channel determination section selects the first state according to the predetermined algorithm, in which only odd- or even-numbered wireless channels among all available wireless channels are measured, and sends the measurement instruction to the channel measurement section.

5. The device of claim 1, wherein the measuring channel determination section selects the first state according to the predetermined algorithm, in which odd- or even-numbered channels including the currently used wireless channel among all available wireless channels are measured, and sends the measurement instruction to the channel measurement section, and if having detected radio interference in any of the odd- or even-numbered channels, measures channels adjacent to the interference-detected channel.

6. The device of claim 1, wherein the wireless device is a wireless channel measurement controller constituting a wireless network together with one or more other wireless terminals each having a channel measurement section for measuring the use states of the wireless channels, and the measuring channel determination section of the wireless channel measurement controller selects between a third state in which only some of all available wireless channels are measured by at least two of the channel measurement section of the wireless channel measurement controller and the channel measurement section of the other wireless terminal and a fourth state in which all the available wireless channels are measured by any two of the channel measurement section of the wireless channel measurement controller and the channel measurement section of the other wireless terminal, according to the predetermined algorithm, and sends the measurement instruction to at least one of the channel measurement sections of the wireless channel measurement controller and the other wireless terminal.

7. The device of claim 6, wherein the measuring channel determination section makes transition to the first or second state if the other wireless terminal becomes unconnected to the wireless network, and makes transition to the third or fourth state if the other wireless terminal becomes connected to the wireless network, according to the predetermined algorithm.

8. The device of claim 6, wherein the measuring channel determination section sends the measurement instruction to the channel measurement section of the other wireless terminal belonging to the same wireless network to measure different wireless channels.

9. The device of claim 6, wherein if radio interference is detected in any of the wireless channels measured by the channel measurement sections, the measuring channel determination section sends the measurement instruction to at least one of the channel measurement sections of the wireless channel measurement controller and the other wireless terminal to measure all available wireless channels.

10. The device of claim 1, wherein the measuring channel determination section selects the second state according to the predetermined algorithm, stores a wireless channel second best in use state among all wireless channels as a replacement candidate channel for a currently-communicating channel, the second-best wireless channel being determined from the results of measurement made for all the wireless channels in response to the measurement instruction sent from the measuring channel determination section to the channel measurement section, selects the first state according to the predetermined algorithm in which only the currently-communicating channel and the replacement candidate channel are measured, and sends the measurement instruction to the channel measurement section.

11. The device of claim 10, wherein the measuring channel determination section selects the second state if radio interference is detected in the replacement candidate channel according to the predetermined algorithm, and sends the measurement instruction to the channel measurement section to instruct the channel measurement section to measure all the available wireless channels.

12. The device of claim 10, wherein the measuring channel determination section selects the second state periodically according to the predetermined algorithm and sends the measurement instruction to the channel measurement section, to thereby update the replacement candidate channel periodically.

13. The device of claim 1, wherein the measuring channel determination section sends the measurement instruction to the channel measurement section of the same device so that all available wireless channels or adjacent channels be measured if radio interference is detected in a wireless channel measured by the channel measurement section and that, if an interference-source channel is detected, the first state in which the interference-source channel is not measured be selected.

14. A wireless device having a function of measuring use states indicating superiority or inferiority of the communication states of two or more wireless channels, the device comprising:
a channel measurement section for measuring the use states of the wireless channels; and
a measuring channel determination section for determining wireless channels to be measured and sending a measurement instruction to the channel measurement section,
wherein the measuring channel determination section selects between a third state in which only some of all available wireless channels are measured by at least two of the channel measurement section and a channel measurement section of one or more other wireless terminals and a fourth state in which all the available wireless channels are measured by any two of the channel measurement section and the channel measurement section of the other wireless terminal, according to the predetermined algorithm, and sends the measurement instruction to the channel measurement section of the wireless device itself and at least one of the channel measurement section of the other wireless terminal.

15. The device of claim 14, wherein if radio interference is detected in any of the wireless channels measured by any of the other wireless terminal and none of the other wireless terminal is measuring a channel adjacent to the interference-detected wireless channel, the measuring channel determination section sends the measurement instruction to the other wireless terminal measuring the interference-detected wireless channel to measure the adjacent channel.

16. The device of claim 14, wherein the measuring channel determination section selects the fourth state according to the predetermined algorithm, stores a wireless channel second best in use state among all wireless channels as a replacement candidate channel for a currently-communicating channel, the second-best wireless channel being determined from the results of measurement made for all the wireless channels in response to the measurement instruction sent from the measuring channel determination section to the channel measurement section, selects the third state according to the predetermined algorithm in which only the currently-communicating channel and the replacement candidate channel are measured, and sends the measurement instruction to the channel measurement section.

17. The device of claim 16, wherein the measuring channel determination section selects the fourth state if radio interference is detected in the replacement candidate channel according to the predetermined algorithm, and sends the measurement instruction to the channel measurement section to instruct the channel measurement section to measure all the available wireless channels.

18. The device of claim 16, wherein the measuring channel determination section selects the fourth state periodically according to the predetermined algorithm and sends the measurement instruction to the channel measurement section, to thereby update the replacement candidate channel periodically.

19. The device of claim 14, wherein the measuring channel determination section sends the measurement instruction to the channel measurement section of the same device so that all available wireless channels or adjacent channels be measured if radio interference is detected in a wireless channel measured by the channel measurement section and that, if an interference-source channel is detected, the third state in which the interference-source channel is not measured be selected.

* * * * *